US012552482B2

(12) United States Patent
Ragland et al.

(10) Patent No.: US 12,552,482 B2
(45) Date of Patent: Feb. 17, 2026

(54) MOTORIZED RUNNING CYCLE

(71) Applicant: StaCyc, LLC, Fort Worth, TX (US)

(72) Inventors: Robert Ryan Ragland, Brock, TX (US); Eric Johnson, Temecula, CA (US); Phillip Charles Burke, Pala, CA (US)

(73) Assignee: StaCyc, LLC, Fort Worth, TX (US)

( * ) Notice: Subject to any disclaimer, the term of this patent is extended or adjusted under 35 U.S.C. 154(b) by 84 days.

(21) Appl. No.: 18/490,311

(22) Filed: Oct. 19, 2023

(65) Prior Publication Data
US 2024/0043083 A1 Feb. 8, 2024

Related U.S. Application Data

(63) Continuation of application No. 18/300,077, filed on Apr. 13, 2023, now Pat. No. 12,122,473, which is a
(Continued)

(51) Int. Cl.
B62J 43/13 (2020.01)
B62J 3/10 (2020.01)
(Continued)

(52) U.S. Cl.
CPC ............... B62J 43/13 (2020.02); B62J 3/10 (2020.02); B62J 25/04 (2020.02); B62J 43/20 (2020.02);
(Continued)

(58) Field of Classification Search
CPC ..... B62J 43/13; B62J 3/10; B62J 25/04; B62J 43/20; B62J 45/00; B62J 45/10;
(Continued)

(56) References Cited

U.S. PATENT DOCUMENTS 3,088,413 A 5/1963 Johnson
3,841,428 A 10/1974 Bialek
(Continued)

FOREIGN PATENT DOCUMENTS

AT 15420 U1 8/2017
CN 201006735 Y 1/2008
(Continued)

OTHER PUBLICATIONS

"OSET Bikes" Oct. 9, 2015, <http://www.osetbikes.com/us> Accessed Feb. 24, 2016.
(Continued)

Primary Examiner — Valentin Neacsu
Assistant Examiner — Marlon A Arce
(74) Attorney, Agent, or Firm — Michael Best & Friedrich LLP

(57) ABSTRACT

A running bike is to be operated selectively with and without power. The running bike includes a front fork rotatably engaged with a front wheel, a rear fork rotatably engaged with a rear wheel, a handlebar coupled to the front fork for steering the running bike, a frame extending between and connecting the front fork and the rear fork, an electronic controller coupled to the frame, and a drivetrain assembly coupled to the frame and in communication with the electronic controller. The drivetrain assembly includes an electric motor configured to selectively drive the rear wheel. A battery selectively provides power to the drivetrain assembly. A clutch is coupled to the handlebar and is in communication with the electronic controller. The clutch is configured to be actuated by an operator to proportionally increase or decrease power to the drivetrain assembly electronically.

24 Claims, 16 Drawing Sheets

Related U.S. Application Data continuation of application No. 16/943,401, filed on Jul. 30, 2020, now Pat. No. 11,654,994, which is a continuation of application No. 15/949,026, filed on Apr. 9, 2018, now Pat. No. 10,730,584, which is a continuation-in-part of application No. 14/850,738, filed on Sep. 10, 2015, now Pat. No. 9,937,975.

(60) Provisional application No. 62/048,834, filed on Sep. 11, 2014.

(51) Int. Cl.
| | | |
|---|---|---|
| *B62J 25/04* | (2020.01) | |
| *B62J 43/20* | (2020.01) | |
| *B62K 9/00* | (2006.01) | |
| *B62K 11/14* | (2006.01) | |
| *B62M 6/70* | (2010.01) | |
| *B62M 6/90* | (2010.01) | |
| *B62J 45/00* | (2020.01) | |
| *B62J 45/10* | (2020.01) | |

(52) U.S. Cl.
CPC .............. *B62K 9/00* (2013.01); *B62K 11/14* (2013.01); *B62M 6/70* (2013.01); *B62M 6/90* (2013.01); *B62J 45/00* (2020.02); *B62J 45/10* (2020.02); *B62K 2204/00* (2013.01)

(58) Field of Classification Search
CPC ...... B62K 9/00; B62K 11/14; B62K 2204/00; B62M 6/70; B62M 6/90
See application file for complete search history.

(56) References Cited

U.S. PATENT DOCUMENTS

| | | | |
|---|---|---|---|
| 4,325,565 A | 4/1982 | Winchell | |
| RE32,031 E | 11/1985 | Winchell | |
| 5,090,715 A | 2/1992 | Nakajima | |
| 5,491,390 A | 2/1996 | McGreen | |
| 5,915,493 A | 6/1999 | Nakayama | |
| 6,012,538 A | 1/2000 | Sonobe et al. | |
| 6,039,137 A | 3/2000 | Schless | |
| 6,095,270 A | 8/2000 | Ishikawa | |
| 6,276,479 B1 | 8/2001 | Suzuki et al. | |
| 6,655,705 B2 | 12/2003 | Turgeon | |
| 6,880,661 B1 | 4/2005 | Oh | |
| 7,513,520 B2 | 4/2009 | Okuyama | |
| D629,049 S | 12/2010 | McFarland | |
| 7,997,604 B2 | 8/2011 | Griep et al. | |
| 8,414,007 B2 | 4/2013 | Chen | |
| 8,617,730 B2 | 12/2013 | Tsukamoto et al. | |
| 8,672,077 B2 | 3/2014 | Sand et al. | |
| 8,881,857 B2 | 11/2014 | Binggeli et al. | |
| 8,967,641 B2 | 3/2015 | De Roeck | |
| 9,120,532 B2 | 9/2015 | Huang | |
| 9,193,411 B2 | 11/2015 | Sand et al. | |
| 9,403,574 B2 | 8/2016 | Sand et al. | |
| 9,580,141 B2 | 2/2017 | Talavasek et al. | |
| 9,616,966 B2 | 4/2017 | Talavasek et al. | |
| 9,777,774 B2 | 10/2017 | Biechele | |
| 9,937,975 B2 | 4/2018 | Ragland et al. | |
| 10,518,841 B2 | 12/2019 | Talavasek et al. | |
| 10,696,355 B2 | 6/2020 | Talavasek et al. | |
| 10,730,584 B2 | 8/2020 | Ragland et al. | |
| 10,800,476 B1 | 10/2020 | Thienphrapa | |
| 10,850,805 B1 | 12/2020 | Noda et al. | |
| 10,906,609 B2 | 2/2021 | Talavasek et al. | |
| 10,906,610 B2 | 2/2021 | Talavasek et al. | |
| 11,046,389 B2 | 6/2021 | Talavasek et al. | |
| 11,117,634 B2 | 9/2021 | Talavasek et al. | |
| 11,124,259 B2 | 9/2021 | Talavasek et al. | |
| 11,161,567 B2 | 11/2021 | Eguchi | |
| 11,242,106 B2 | 2/2022 | Chen et al. | |
| 11,325,678 B2 | 5/2022 | Wecker et al. | |
| 11,345,437 B2 | 5/2022 | Talavasek et al. | |
| 11,383,792 B1 | 7/2022 | Thienphrapa | |
| 11,603,165 B2 | 3/2023 | Ragland et al. | |
| 11,975,799 B2 | 5/2024 | Ragland et al. | |
| 2002/0046891 A1 | 4/2002 | Honda et al. | |
| 2005/0087379 A1 | 4/2005 | Holland | |
| 2005/0140115 A1 | 6/2005 | Francis et al. | |
| 2007/0001423 A1 | 1/2007 | Murnen et al. | |
| 2009/0161903 A1* | 6/2009 | White | H04R 27/00 381/395 |
| 2010/0052287 A1 | 3/2010 | McFarland | |
| 2010/0148460 A1 | 6/2010 | Nelson et al. | |
| 2010/0175942 A1 | 7/2010 | Griep et al. | |
| 2010/0206652 A1* | 8/2010 | Kielland | B62K 3/005 180/220 |
| 2011/0124454 A1 | 5/2011 | Song | |
| 2011/0284303 A1 | 11/2011 | Shwartz | |
| 2012/0000724 A1 | 1/2012 | Mimura et al. | |
| 2012/0234636 A1 | 9/2012 | McFarland | |
| 2013/0020777 A1 | 1/2013 | Chen | |
| 2013/0032425 A1 | 2/2013 | Lee et al. | |
| 2013/0081894 A1* | 4/2013 | Ishikawa | B62M 7/04 180/220 |
| 2013/0168943 A1 | 7/2013 | Kettler et al. | |
| 2013/0177196 A1 | 7/2013 | Lee | |
| 2013/0231810 A1 | 9/2013 | Garcia | |
| 2013/0270022 A1 | 10/2013 | Matsuda | |
| 2013/0288841 A1 | 10/2013 | Yoshino et al. | |
| 2014/0076097 A1 | 3/2014 | Stewart | |
| 2014/0077470 A1 | 3/2014 | Chen | |
| 2014/0319907 A1 | 10/2014 | Yamazaki | |
| 2014/0336858 A1* | 11/2014 | Matsushima | B62M 11/06 701/22 |
| 2014/0379209 A1* | 12/2014 | Matsuda | B60L 58/16 701/34.2 |
| 2016/0297499 A1* | 10/2016 | Ohashi | B60K 35/00 |
| 2017/0088013 A1* | 3/2017 | Shimizu | B60L 50/51 |
| 2018/0072380 A1 | 3/2018 | Talavasek et al. | |
| 2018/0241022 A1 | 8/2018 | Nishihara et al. | |
| 2018/0327040 A1 | 11/2018 | Spicer | |
| 2019/0039677 A1 | 2/2019 | Noda et al. | |
| 2019/0039687 A1 | 2/2019 | Lay et al. | |
| 2019/0112000 A1 | 4/2019 | Noda et al. | |
| 2020/0062325 A1 | 2/2020 | Talavasek et al. | |
| 2020/0062329 A1 | 2/2020 | Talavasek et al. | |
| 2020/0062339 A1 | 2/2020 | Talavasek et al. | |
| 2020/0062341 A1 | 2/2020 | Talavasek et al. | |
| 2020/0062342 A1 | 2/2020 | Talavasek et al. | |
| 2020/0079471 A1 | 3/2020 | Eguchi | |
| 2020/0247501 A1 | 8/2020 | Kameda et al. | |
| 2020/0247502 A1 | 8/2020 | Mitsuyasu et al. | |
| 2020/0354019 A1 | 11/2020 | Ragland et al. | |
| 2021/0269119 A1 | 9/2021 | Boehnke et al. | |
| 2021/0380192 A1 | 12/2021 | Demond | |
| 2022/0306240 A1 | 9/2022 | Talavasek et al. | |

FOREIGN PATENT DOCUMENTS

| | | |
|---|---|---|
| CN | 201049678 Y | 4/2008 |
| CN | 201086768 Y | 7/2008 |
| CN | 201165286 Y | 12/2008 |
| CN | 102390468 A | 3/2012 |
| CN | 102447085 A | 5/2012 |
| CN | 103303400 A | 9/2013 |
| CN | 103359253 A | 10/2013 |
| CN | 203581244 U | 5/2014 |
| CN | 103889832 A | 6/2014 |
| CN | 104010929 A | 8/2014 |
| CN | 210083435 U | 2/2020 |
| DE | 102011079094 A1 | 7/2012 |
| DE | 202012104843 U1 | 1/2013 |
| DE | 202016102118 U1 | 8/2017 |
| DE | 202016103772 U1 | 8/2017 |
| DE | 202016104758 U1 | 12/2017 |
| DE | 202017004040 U1 | 11/2018 |
| DE | 102017006574 A1 | 1/2019 |
| DE | 202019106361 U1 | 1/2020 |
| DE | 102020100712 A1 | 8/2020 |

(56) References Cited

FOREIGN PATENT DOCUMENTS

| | | | |
|---|---|---|---|
| DE | 102020100724 A1 | 8/2020 | |
| DE | 102020134352 A1 | 7/2021 | |
| EP | 2230164 B1 | 5/2012 | |
| EP | 2957494 A1 | 12/2015 | |
| EP | 3109145 A1 | 12/2016 | |
| EP | 2731858 B1 | 1/2017 | |
| EP | 2739522 B1 | 9/2017 | |
| EP | 3437977 A1 | 2/2019 | |
| EP | 3109146 B1 | 9/2019 | |
| EP | 3191361 B1 | 9/2019 | |
| EP | 3620362 A1 | 3/2020 | |
| FR | 3064242 A1 | 9/2018 | |
| FR | 3065704 A1 | 11/2018 | |
| GB | 2511522 A | 9/2014 | |
| JP | H07117487 A | 5/1995 | |
| JP | 2010132247 A | 6/2010 | |
| JP | 2013147153 A | 8/2013 | |
| JP | 2019031263 A | 2/2019 | |
| KR | 20090103259 A | 10/2009 | |
| NL | 2021658 B1 | 5/2020 | |
| TW | 454748 U | 9/2001 | |
| TW | 201332833 A | 8/2013 | |
| TW | M581557 U | 8/2019 | |
| TW | M582478 U | 8/2019 | |
| WO | 2013050193 A1 | 4/2013 | |
| WO | 2013150411 A1 | 10/2013 | |
| WO | 2016206731 A1 | 12/2016 | |
| WO | 2018042269 A1 | 3/2018 | |
| WO | 2020007496 A1 | 1/2020 | |
| WO | 2020041425 A1 | 2/2020 | |
| WO | 2020097637 A1 | 5/2020 | |

OTHER PUBLICATIONS

"Kuberg Start" Oct. 9, 2015, < http://www.kuberg.com/p-2-start.aspx/> l\ccessed Feb. 24, 2016.

"MX650—Dirt Rides, Supercross Inspired" Oct. 9, 2015, < http://www.razor.com/products/dirt/mx650/> Accessed Feb. 24, 2016.

"Strider Bikes—We love inspiring kids to ride" Oct. 9, 2015, < http://www.striderbikes.com> Accessed Feb. 24, J016.

"Pro Mini 12" l Muna Bikes" Oct. 9, 2015, < http://www.munabikes.com/index.php/boys-bikes/pro-mini-12> \ccessed Feb. 24, 2016.

"Hyper Motorbike Boys' 36-Volt Electric Bike—Walmart.com" Oct. 9, 2015, < http://www.walmart.com/ip/Hyper-Motobike-Boys-36-Volt-Electric-Bike/23149110> Accessed Feb. 24, 2016.

"Electric strider—YouTube" Oct. 9, 2015, < http://www.youtube.com/watch?v=hDwzR6nBsns> Accessed Feb. 24, 2016.

Zhumin, "Metalworking Practice 2nd Edition", Chengdu: Southwest Jiaotong University Press, Jan. 2012 (pp. 173-175 with English Translation).

Decision of Rejection issued from the Chinese Patent Office for related Application No. 201580063099.2 dated Feb. 3, 2020 (16 Pages including English Translation).

Third Office Action issued from the Chinese Patent Office for related Application No. 2015800639099.2 dated Aug. 13, 2019 (31 Pages).

Second Office Action issued from the Chinese Patent Office for related Application No. 201580063099.2 dated May 10, 2019 (15 Pages including English Translation).

First Office Action issued from the Chinese Patent Office for related Application No. 201580063099.2 dated Nov. 5, 2018 (11 Pages including English Translation).

Search Report issued from the Chinese Patent Office for related Application No. 201580063099.2 dated Oct. 19, 2018 (5 Pages including English Translation).

Examination Report issued from the Australia Patent Office for related Application No. 2015314858 dated Jul. 19, 2018, (6 Pages).

Extended Search Report issued from the European Patent Office for related Application No. 15839453.6 dated Apr. 6, 2018 (6 Pages).

International Search Report with Written Opinion for related Application No. PCT/US2021/062406 dated Mar. 8, 2022 (14 Pages).

Cycle News, Stacyc 18eDrive & 20eDrive, https://www.cyclenews.com/2022/04/article/stacyc-18edrive-20edrive/, Apr. 27, 2022.

YouTube, "Stacyc 18eDrive & 20eDrive Electric Balance Bikes Review," https://www.youtube.com/watch?v=AA4_EToLtH8&t=5s, Nov. 30, 2022.

MotoSport, Stacyc 20eDrive Stability Cycle—2022 Launch Edition, Nov. 30, 2022, https://www.motosport.com/stacyc-20edrive-stability-cycle-2022-launch-edition?variant[SCY0017]=SCY0017-X001-Y001.

YouTube, "20eDrive Team Edition Tech," Aug. 7, 2023, https://www.youtube.com/watch?v=wQbems_3XBl&list=TLGGfxawwmG_qi UwOTExMjAyMw.

Trials Bike, Sherco EB12 Electric Balance Bike $635.45, https://www.trialsbike.com.au/product/sherco-eb12-electric-balance-bike/, available as early as Mar. 16, 2022.

Chinese Patent Office Action for Application No. 202210733303.9 dated Feb. 28, 2024 (29 pages including English translation).

* cited by examiner

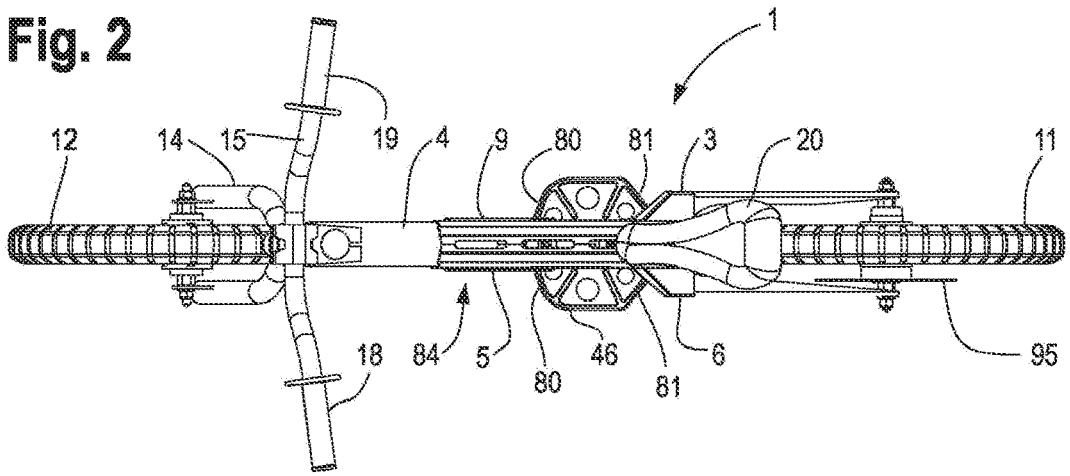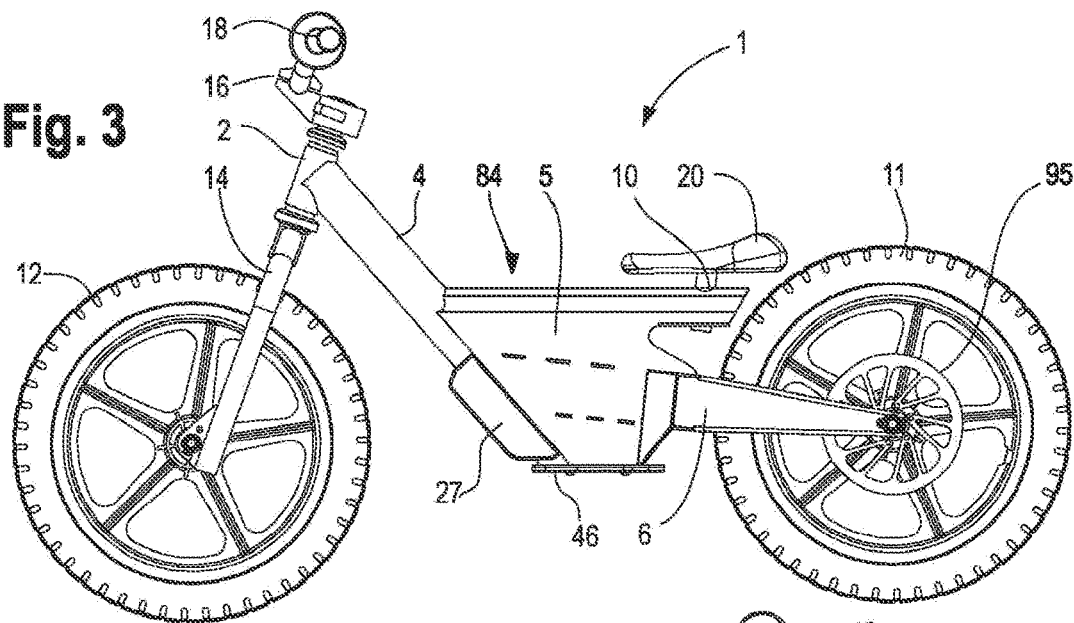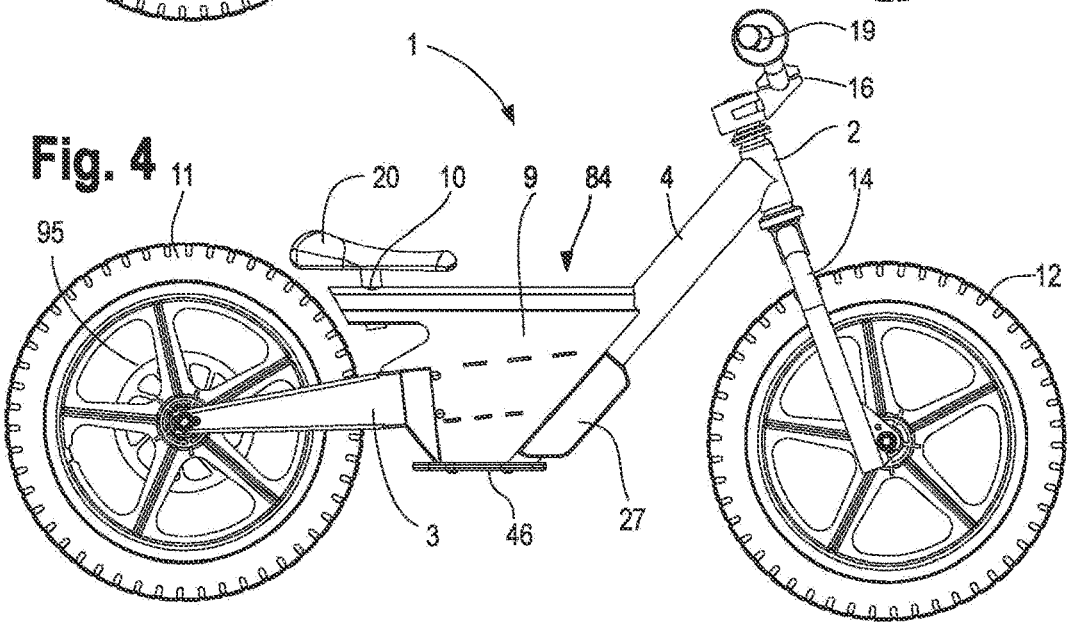

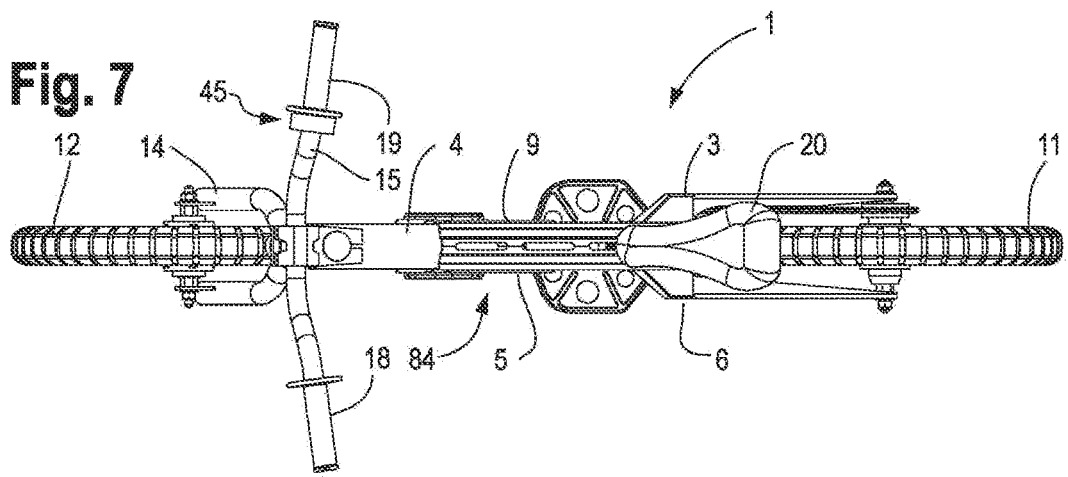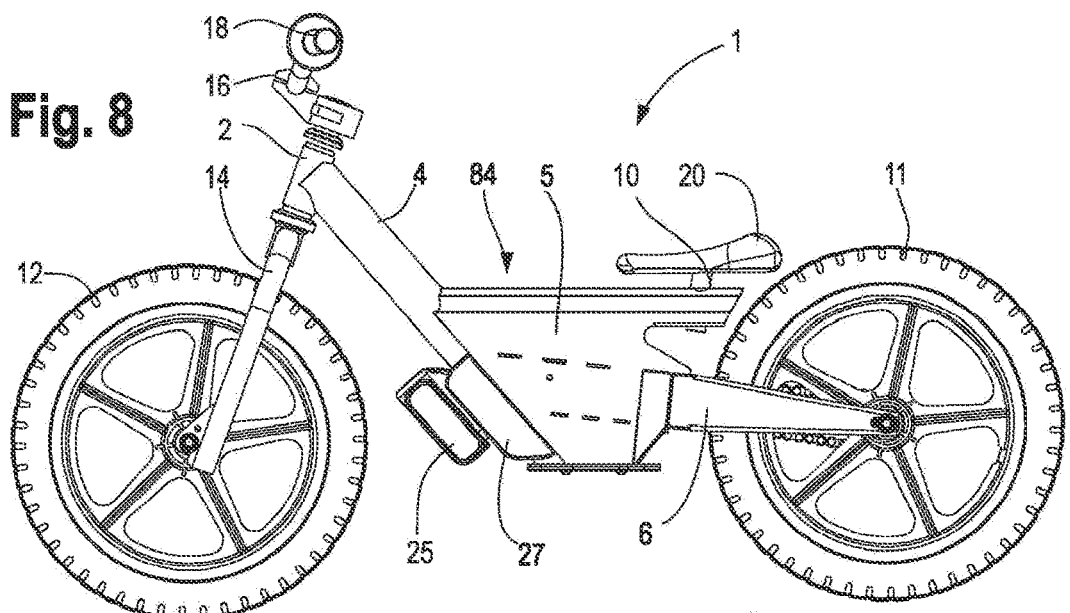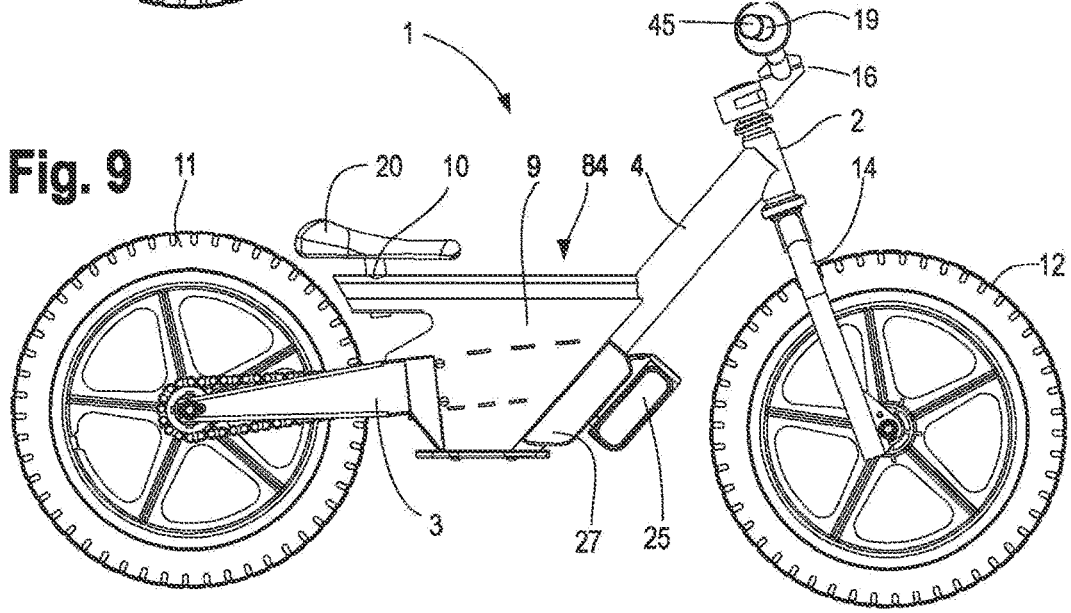

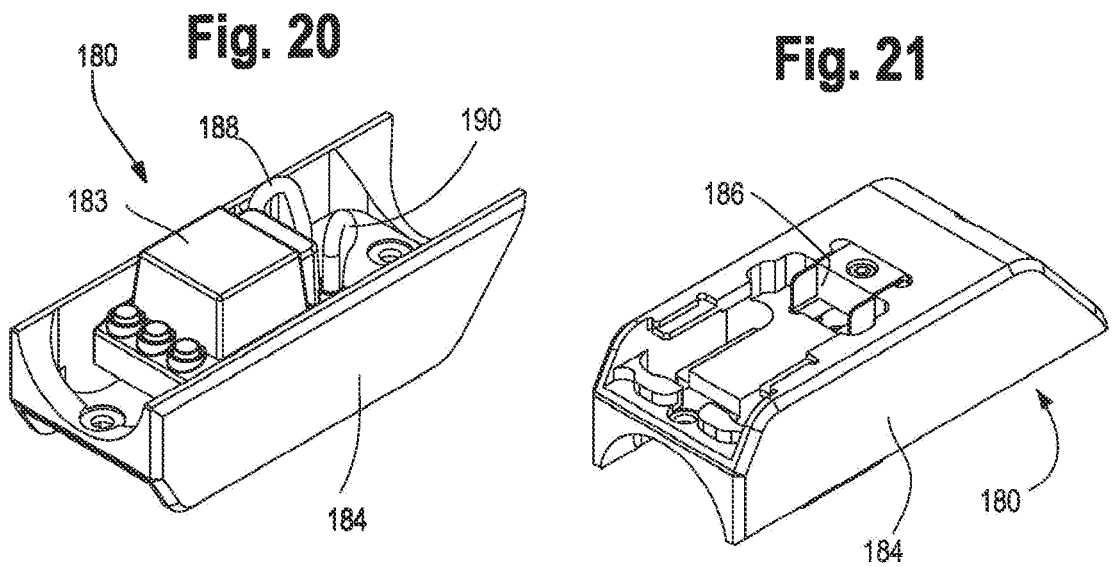
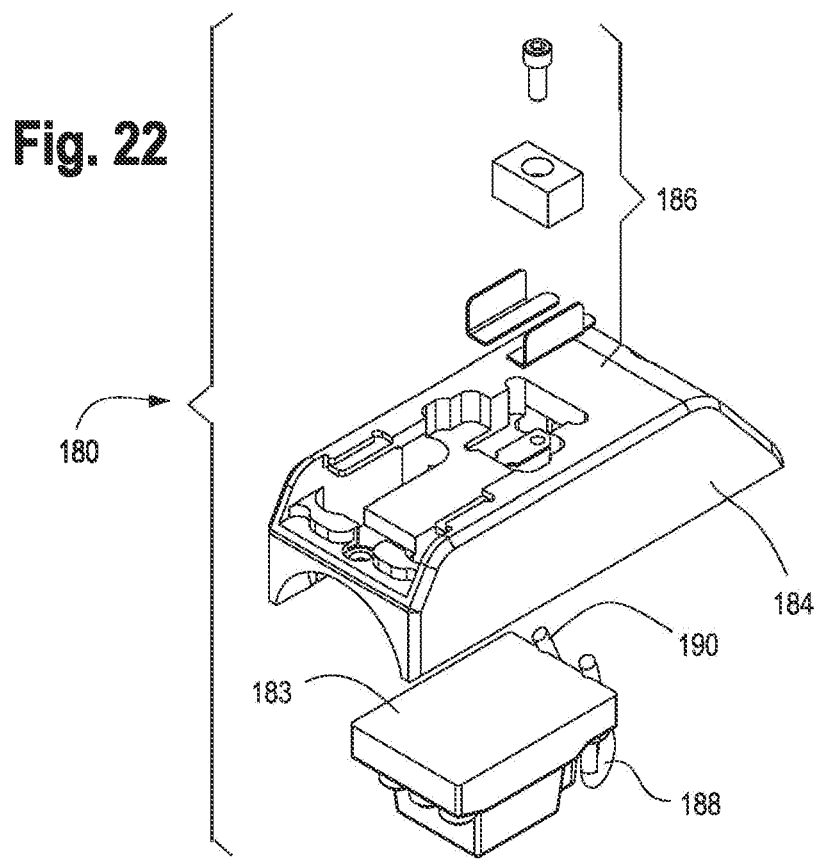

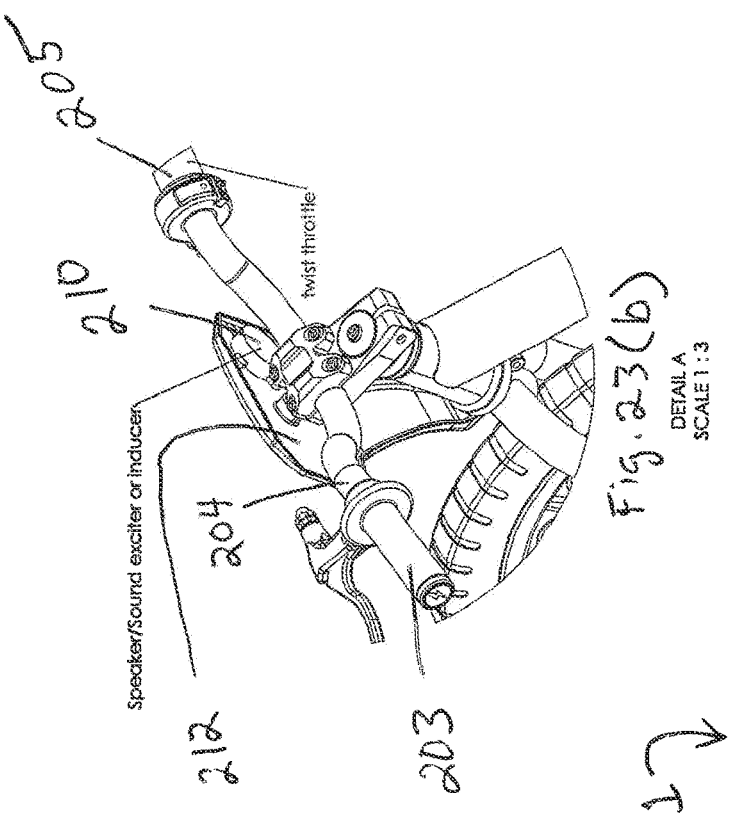
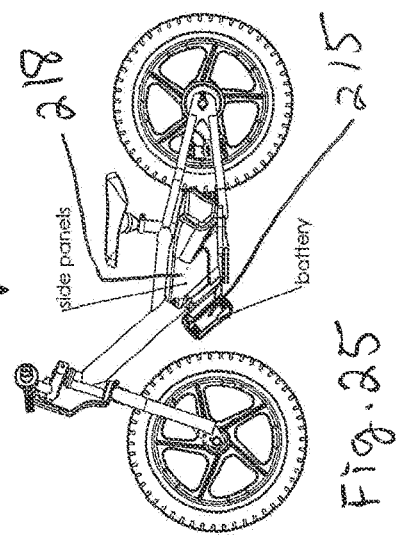
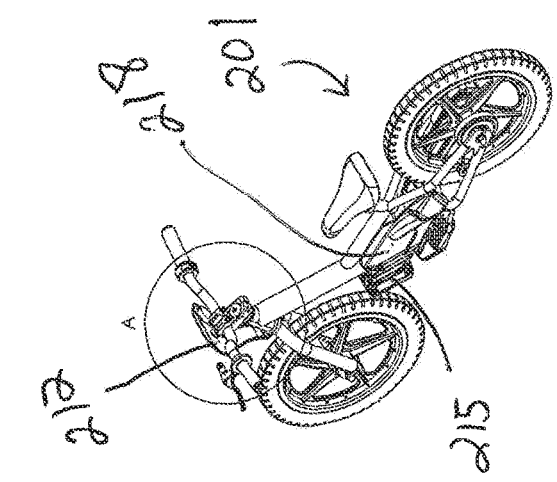
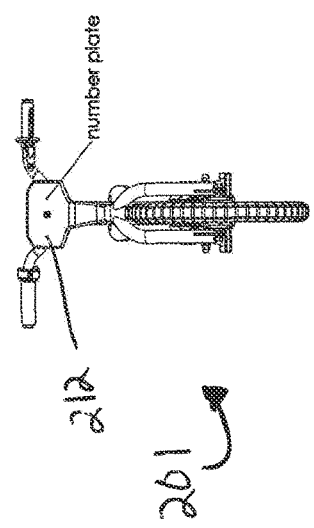

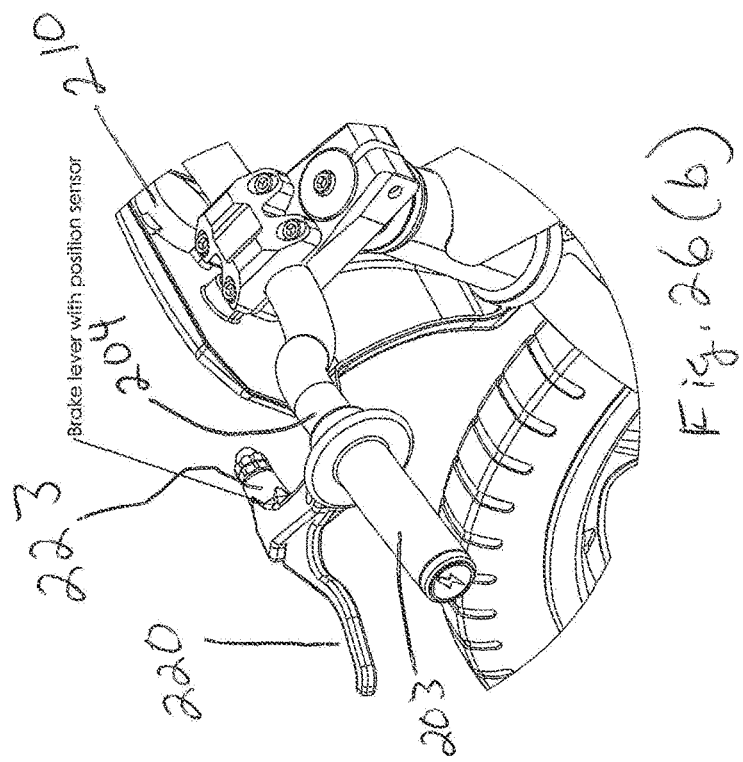
Fig. 26(b)
DETAIL C
SCALE 1:2
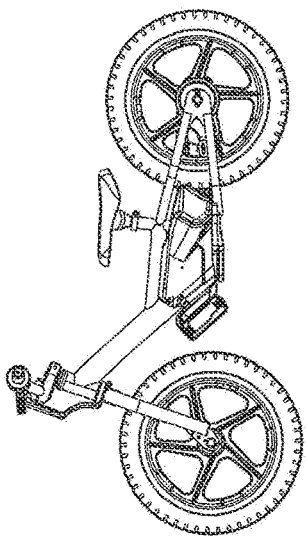
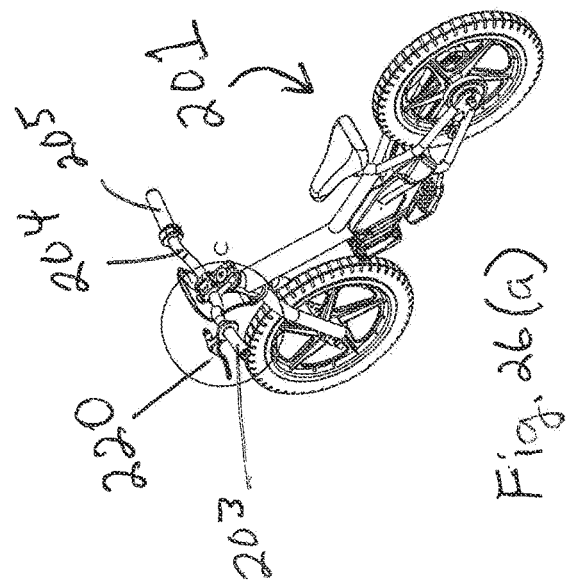
Fig. 26(a)
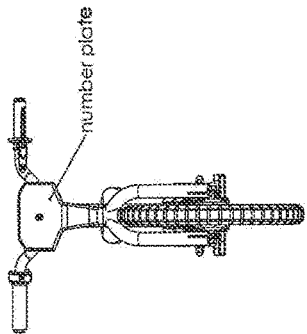

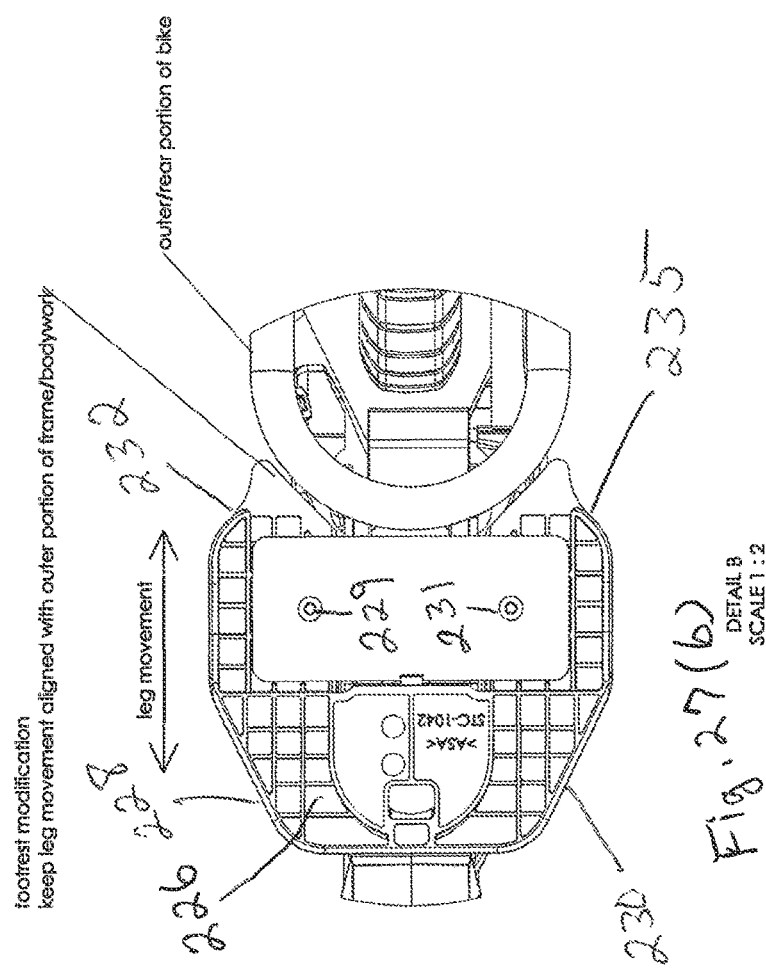
Fig. 27(b)
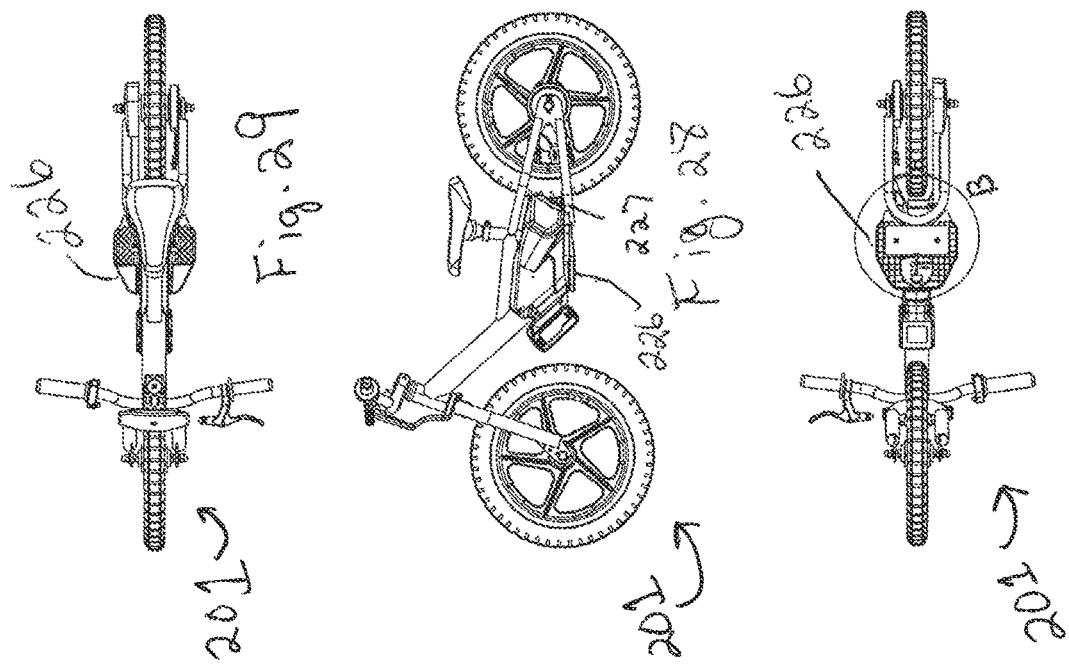
Fig. 29
Fig. 28
Fig. 27(a)

MOTORIZED RUNNING CYCLE

CROSS-REFERENCE TO RELATED APPLICATION

This application is a continuation of U.S. patent application Ser. No. 18/300,077 filed Apr. 13, 2023, which is a continuation of U.S. patent application Ser. No. 16/943,401 filed Jul. 30, 2020, now U.S. Pat. No. 11,654,994, which is a continuation of U.S. patent application Ser. No. 15/949,026 filed Aug. 9, 2018, now U.S. Pat. No. 10,730,584, which is a Continuation-in-Part of U.S. patent application Ser. No. 14/850,738 filed Sep. 10, 2015, which is related and claims priority to U.S. Provisional Patent Application No. 62/048,834 filed Sep. 11, 2014, each of which is assigned to the same assignee with the same inventors, and is incorporated herein by reference in its entirety.

FIELD OF THE INVENTION

This invention relates generally to devices used to train children to properly learn how to balance and control a two wheeled vehicle such as a bicycle or a motorcycle. Secondarily, the invention relates to devices for training children how to use a throttle and brake to control a motor driven vehicle such as a small motorcycle. The invention allows for the growth of the child's skills from initial balance, to the more complex task of combining balance, throttle control, and braking, enabled by a lightweight form, low seat height and narrow foot platform.

BACKGROUND OF THE INVENTION

This section describes the background art of the disclosed embodiments of the present invention. There is no intention, either express or implied, that the background art discussed in this section legally constitutes prior art.

There have been a number of recent advancements in the techniques and devices to use to teach children how to ride a bicycle. One example has been the use of a balance bike, also called a running bike, similar to that referenced in U.S. Patent Publication No. US2010/0052287 to Mcfarland ("McFarland"). The McFarland vehicle is primarily a bicycle with a low seat height, but does not include pedals or cranks to propel the vehicle. This arrangement allows for a child to use the child's feet and legs to propel and balance the bike by walking or running, until the skill level of the user increases and the child can push and coast the bike.

Further reference may be made to the following patents; U.S. Pat. No. 8,414,007; U.S. Patent Publication No. US2014/0077470; and U.S. Pat. No. 8,794,654.

While this concept has been great at teaching very young children how to balance, the youngest age groups still lack the ability, strength and dexterity to advance to riding a standard bicycle with pedals and cranks Thus, actually pedaling the bicycle becomes the next skill that needs to be conquered. During this transition from running bike to bicycle, often parents must simply wait for the child's motor skills to develop to the point where the child can keep their feet on the pedals while pedaling in a circular motion.

In addition to learning the basic skill of balancing on two wheels, for motorcycle riding, a child must learn the basic throttle control system through the use of twisting the throttle on the handlebar. This technique is difficult to teach, and somewhat dangerous if there is not constant adult supervision. There have been previous attempts to aid children by putting training wheels on small motorcycles, which can allow training of some balancing skills to be separated from throttle control skills. While this technique may reduce anxiety and allow earlier development, training wheels still fail to provide a completely realistic training tool for learning balance and throttle control. Further, the weight and size of the bike are concerns for smaller and younger children. Another potential problem occurs when a motorcycle may be ridden too fast before the child has a chance to acquire the skills needed to modulate the throttle, thus becoming more dangerous than necessary.

Another problem arises when attempting to provide a vehicle that has a low enough seat height so that a small child can straddle the vehicle or sit on the seat and still keep both feet on the ground. For bicycles, this problem arises because of the space required to provide the pedals and gears, while for motorcycles, the problem relates to providing a relatively large engine and other components. As a result, for both bicycles and motorcycles, the seat height must be raised to accommodate these components, thus resulting in seat heights that are too high for a child to keep both feet on the ground.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIG. 2 is a top view of the convertible running bike (non-motorized configuration) of FIG. 1;

FIG. 3 is a side view of the convertible running bike (non-motorized configuration) of FIG. 1;

FIG. 4 is another side view of the convertible running bike (non-motorized configuration) of FIG. 1;

FIG. 7 is a top view of the convertible running bike (motorized configuration) of FIG. 6;

FIG. 8 is a side view of the convertible running bike (motorized configuration) of FIG. 6;

FIG. 9 is another side view of the convertible running bike (motorized configuration) of FIG. 6;

FIG. 20 is a top view of the electronic control/battery mount assembly of FIGS. 14 and 15 according to an embodiment;

FIG. 21 is a bottom view of the electronic control/battery mount assembly of FIGS. 14 and 15 according to an embodiment;

FIG. 22 is an exploded view of the electronic control/battery mount assembly of FIGS. 14 and 15 according to an embodiment;

FIG. 23(*a*) and FIG. 23(*b*) show perspective views of another convertible running bike in a motorized configuration including a sound system, which is constructed according to an embodiment;

FIG. 24 is a front view of the convertible running bike of FIG. 23;

FIG. 25 is a side view of the convertible running bike of FIG. 23;

FIG. 26(*a*) and FIG. 26(*b*) show perspective views of the convertible running bike of FIG. 23 including a clutch, which is constructed according to an embodiment;

FIG. 27(*a*) and FIG. 27(*b*) shows perspective views of the convertible running bike of FIG. 23 including a footrest, which is constructed according to an embodiment;

FIG. 28 is a side view of the convertible running bike of FIG. 27; and

FIG. 29 is a top view of the convertible running bike of FIG. 27.

DETAILED DESCRIPTION

Figure 1:
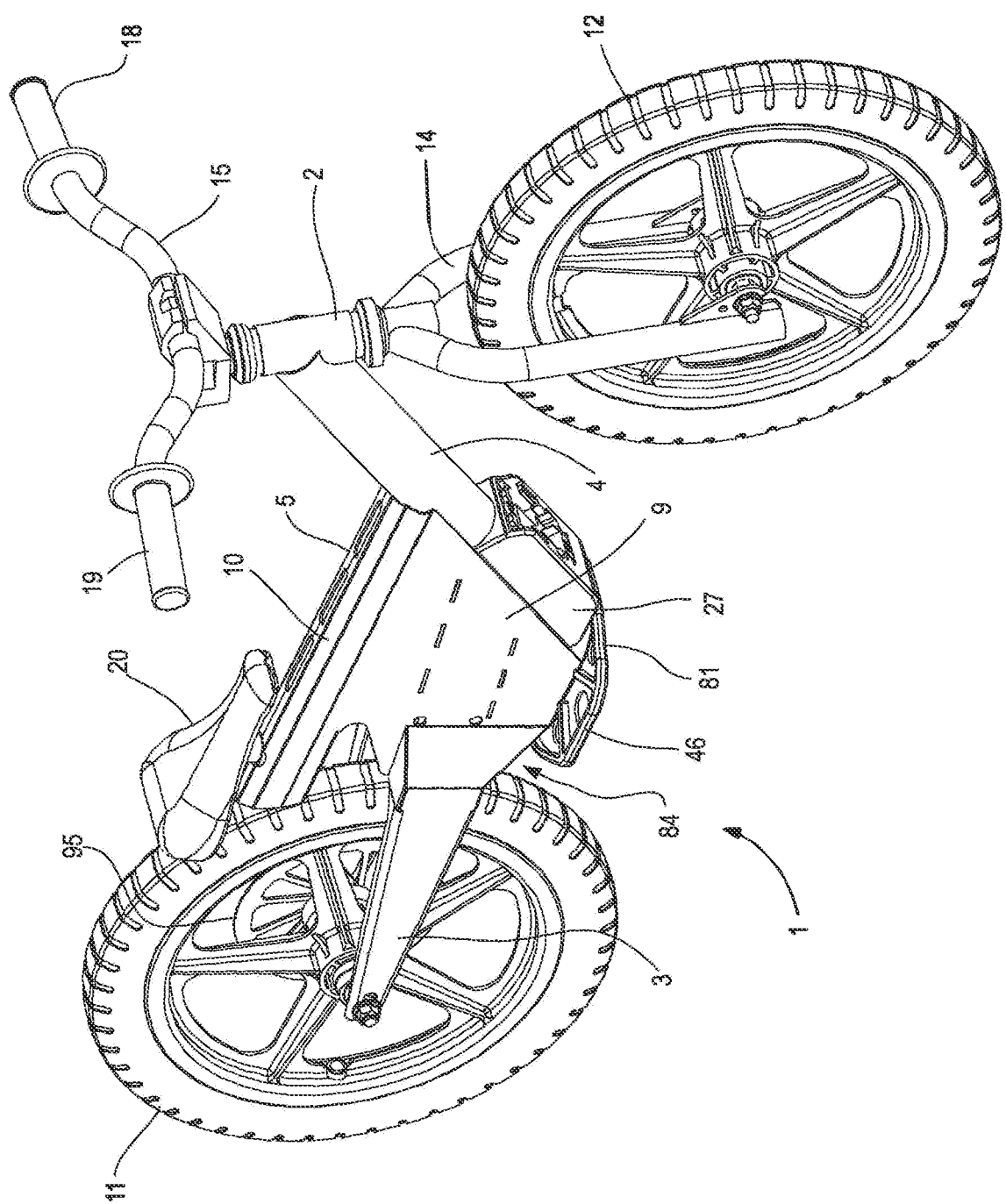
FIG. 1 shows a perspective view of a convertible running bike in a non-motorized configuration, which is constructed according to an embodiment.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the system, components and method of the present invention, as represented in the drawings, is not intended to limit the scope of the invention, as claimed, but is merely representative of the embodiment of the invention.

Therefore, the present invention provides a convertible running bike with a small, electronically controlled motor in order to solve training problems found in conventional solutions. As with the logic of a simple running bike, the convertible running bike allows a child to learn to use their feet and legs to balance, propel and stop before having to learn to drive the feet in a circular pedaling motion, without being able to easily touch the ground while sitting on the seat. Further, the motorized running bike of the present invention provides a controlled way for a child to propel the bike using their hand on a throttle in a similar manner used with motorcycles. The learning process for the convertible running bike may be controlled and adapted to each child's ability by an adult. This process can be further controlled by features included in the electronic capability such as maximum rates of speed. Because a child will remain interested with these new functions, the child can enjoy the motorized running bike without becoming frustrated with the complex task of driving their legs in a circular motion before they are physically capable.

The convertible motorized running bike of the present invention is designed to be both a toy, and also a training device for both a bicycle and motorcycle. The invention has a frame that acts in a similar function to one of today's current balance bikes, with no crank set or pedals, and has a slender profile that aids with walking/balancing leg movements. In this configuration, the frame is lightweight so that a young child can have confidence in handling, controlling and lifting the bike.

Once a child has mastered the basics and is able to coast, turn, and slow down for obstacles, the frame may be fitted with a motorized propulsion system. The frame is adapted to support the addition of the motorized system components, so that the motorized version of the present invention may be controlled in manners similar to an ATV or motorcycle. The motor may be easily attached to the frame in a prefabricated motor location, and a chain may then be installed to provide propulsion to the rear wheel. The motorized version may be controlled with either a thumb throttle or twist throttle. In various embodiments, the motor is an electrical type motor that may be modulated and controlled via the throttle by the rider. In other embodiments, the motor speed and bike acceleration may be preset by an adult through a smart device application, a wireless transmitter, or a directly connected cable, mechanism or programmable key to provide an extra level of safety for the child until they acquire the appropriate skill level to control the vehicle.

As a result, a child will be able to more easily learn the mechanics and skills of motorcycle riding on a lightweight vehicle, instead of heavier and more powerful vehicle, such as a gas powered motorcycle. By having the ability to continue learning motorcycle riding skills after learning balance skills, a child can maintain fun and interest during the time period before they begin to develop the leg skill to pedal a normal bicycle. In addition, a child can gain a tremendous amount of throttle control skill and vehicle awareness before they begin to ride a heavier and faster motorcycle.

In other embodiments, the convertible running bike may have the motorized components installed and in place, but not used, thus allowing a child to learn to balance the slightly heavier bike before activating the motorized system to provide propulsion to the bike.

A convertible running bike capable of selectively converting from a non-motorized configuration to a motorized configuration may include a front fork rotatably engaged with a front wheel, a handle bar rotatably engaged with the front fork for steering the bike, a frame and a seat connected to the frame. The frame may include a down tube portion connected to the front fork, a rear fork rotatably engaged with a rear wheel, a drivetrain receiving region for selectively receiving a drivetrain assembly, and a battery mount for selectively receiving a battery.

The convertible running bike may also include a drivetrain assembly disposed within the drivetrain receiving region and having a first sprocket, an electronic controller disposed within an electronic control housing receiving region and coupled to the drivetrain assembly, a battery disposed within the battery mount, a throttle sensor coupled to the electronic controller, a second sprocket connected to the rear wheel, a chain connected to the first sprocket and the second sprocket. In response to an input to the throttle sensor, the electronic controller causes the drivetrain assembly to rotate the first sprocket, the first sprocket driving the chain, and the chain rotating the second sprocket and the rear wheel and the convertible running bike operates in the motorized configuration.

In an embodiment, the bike may include a footrest. The drivetrain assembly may include a brush motor or a brushless motor. The frame may include a left portion and a right portion.

In another embodiment, a running bike capable of selectively converting from a non-motorized configuration to a motorized configuration may include a front fork rotatably engaged with a front wheel, a handle bar rotatably engaged with the front fork for steering the bike, a frame and a seat connected to the frame. The frame may include a down tube portion connected to the front fork, a rear fork rotatably engaged with a rear wheel, a drivetrain receiving region for selectively receiving a drivetrain assembly, a battery mount for selectively receiving a battery, such that the convertible running bike operates in the non-motorized configuration. In an embodiment, the bike may include a footrest. The frame may include a left portion and a right portion.

In a further embodiment, a method of selectively converting a convertible running bike from a non-motorized configuration to a motorized configuration where the convertible running bike includes a front fork rotatably engaged with a front wheel, a handle bar rotatably engaged with the front fork for steering the bike, a frame including a down tube portion connected to the front fork, a rear fork rotatably engaged with a rear wheel, a drivetrain receiving region for selectively receiving a drivetrain assembly, a battery mount for selectively receiving a battery; and a seat connected to the frame. The method may include disposing a drivetrain assembly having a first sprocket within the drivetrain receiving region, disposing an electronic controller within an electronic control housing receiving region and coupling to the drivetrain assembly, disposing a battery within the battery mount, coupling a throttle sensor to the electronic controller, connecting a second sprocket to the rear wheel, connecting a chain to the first sprocket and the second sprocket. In response to an input to the throttle sensor, the electronic controller causes the drivetrain assembly to rotate the first sprocket, the first sprocket driving the chain, and the chain rotating the second sprocket and the rear wheel, and the convertible running bike operates in the motorized configuration.

A convertible running bike without pedals for riding by a child capable of selectively converting from a non-motorized configuration to a motorized configuration may include a front fork rotatably engaged with a front wheel, a handle bar rotatably engaged with the front fork for steering the bike, a frame, a footrest and a seat connected to the frame. The frame may include a down tube portion connected to the front fork, a rear fork rotatably engaged with a rear wheel, a drivetrain receiving region for selectively receiving a longitudinal drivetrain assembly, an electronic control housing for selectively receiving an electronic control assembly, and a battery mount for selectively receiving a battery. The bike may also include a footrest for causing the child's feet or legs to be pushed outwardly away from the running bike.

In an embodiment, the convertible running bike may also include a drivetrain assembly disposed within the drivetrain receiving region and having a first sprocket, an electronic controller disposed within an electronic control housing receiving region and coupled to the drivetrain assembly, a battery disposed within the battery mount, a throttle sensor coupled to the electronic controller, a second sprocket connected to the rear wheel, a chain connected to the first sprocket and the second sprocket. In response to an input to the throttle sensor, the electronic controller causes the drivetrain assembly to rotate the first sprocket, the first sprocket driving the chain, and the chain rotating the second sprocket and the rear wheel and the convertible running bike operates in the motorized configuration.

In an embodiment, the footrest may include an angled front portion for causing the child's feet or legs to be pushed outwardly away from the running bike. The footrest may further include an angled rear portion for causing the child's feet or legs to be pushed outwardly away from the running bike.

In an embodiment, the bike may include a sound system. In various embodiments, the sound system may be attached to a number plate or disposed within the battery. In another embodiment, the bike further includes a left side panel and a right side panel attached to the frame, and the sound system is disposed within the left and right side panels.

In an embodiment, the bike may include a clutch attached to the handlebar such that the operation of the clutch by the rider creates sounds that mimic a motorcycle or other vehicle, or creates other sounds.

In an embodiment, the handlebar further includes a diameter which may comprise various sizes based on the size of a rider's hands.

Referring now to FIGS. 1-5 of the drawings, a convertible running bike 1 may be constructed according to a non-motorized embodiment and includes a mainframe assembly 84 having a steering tube 2 connected to a down tube 4. The down tube 4 is connected to a mainframe right portion 9 and a mainframe left portion 5. The mainframe right portion 9 is connected to a rear fork right 3 and the mainframe left portion 5 is connected to rear fork left 6. A rear wheel 11 is rotatably connected to the rear fork left 6 and rear fork right 3 by conventional bicycle axle hardware such as nuts, bolts and bearings that will not be described in detail. A conventional brake, such as disc brake 95, may be attached to the rear wheel 11. Other brake mechanisms may be employed such as a drum brake. Similarly, a front wheel 12 is connected to a front fork assembly 14, which passes through a steering tube 2 and connects to the handlebars 15 having a left grip 18 and a right grip 19. A seat 20 is connected to the mainframe left portion 5 and the mainframe right portion 9 through an adjustable seat tube 10. The seat 20 is adjustable for children of different ages and heights. The seat height is adjustable to account for both comfort considerations for the child, but also to provide an optimum height where the child may be able to straddle the bike, either sitting in the seat or standing, and still keep both feet on the ground. In an embodiment, the steering tube 2, the handlebars 15, the grips 18 and 19, the seat 20 and the adjustable seat tube may comprise conventional bicycle components, thus providing a more inexpensive manufacturing process.

Figure 6:
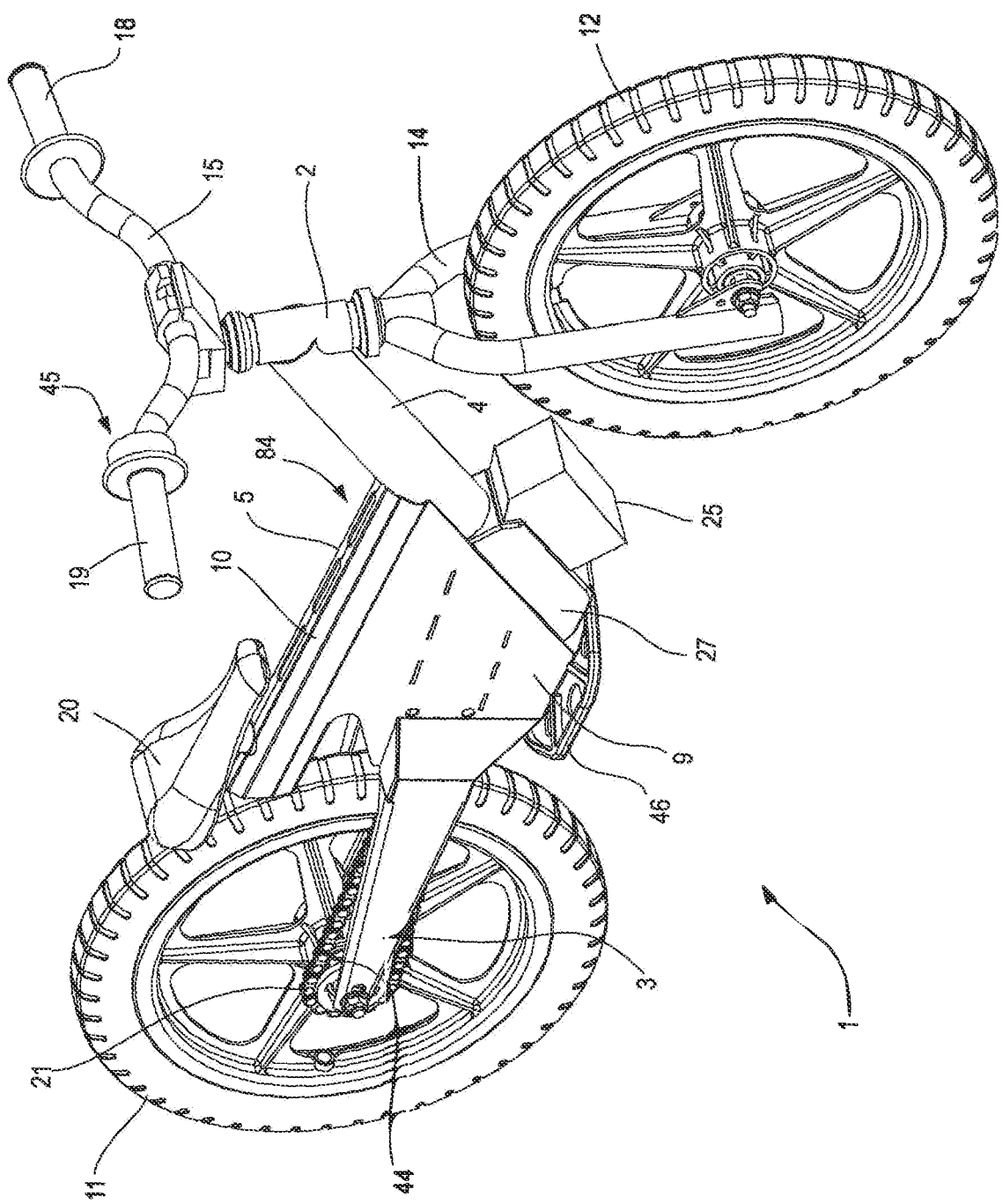
FIG. 6 shows a perspective view of the convertible running bike of FIG. 1 in a motorized configuration.

FIG. 2 illustrates the slim nature of the convertible running bike (non-motorized configuration), which is designed to allow for a young child to straddle the running bike and perform an easy running motion of the legs. The orientation of the grips 18 and 19, and in embodiments of the convertible running bike (motorized configuration), either grip 18 and 19 may function as a throttle input from the child rider. As shown in FIG. 6, the right grip 19 to may be integrated with a throttle sensor 45. In an embodiment for the convertible running bike (motorized configuration), the throttle sensor 45 may be set in a mode where a child could twist the throttle around its longitudinal circumference in order to adjust the amount of power provided to an electric motor, or other type of propulsion system. In another embodiment for the convertible running bike (non-motorized configuration), the throttle sensor 45 may be locked in a stationary mode to provide a stationary grip when not being used to modulate the electric motor.

Also shown is footrest 46 attached to a plate 150 disposed on the bottom of the mainframe left portion 5 and the mainframe right portion 9 to provide a location for a child to rest their feet during coasting or propulsion. Further, the footrest 46 is shaped narrow enough with gentle angles to provide non-traumatic surfaces to the legs while the child balances and runs with the bike. More specifically, the footrest 46 includes an angled front portion 80 and an angled rear portion 81 that provide a gentle slope such that if a child is straddling the convertible running bike 1 and is standing either directly in front of or behind the footrest 46, if the bike moves in the direction of child's feet, the angled front portion 80 or the angled rear portion 81 cause the child's feet and/or legs to be pushed outwardly away from the bike. Therefore, unlike a conventional bicycle with pedals or motorcycle with footpegs, the footrest 46 will not tend to strike and potentially injure the child's feet and/or legs.

Figure 5:
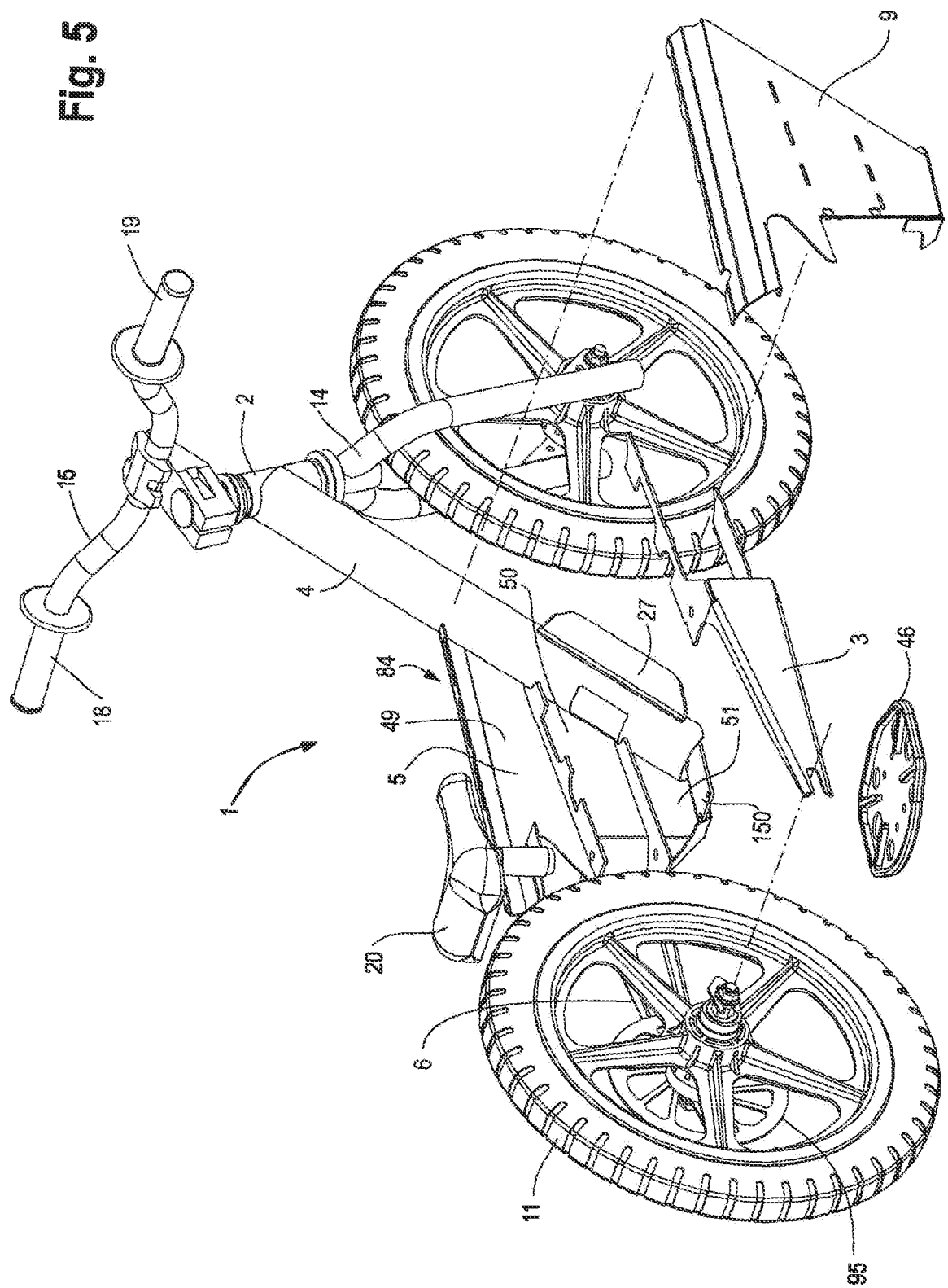
FIG. 5 is an exploded, perspective view of the convertible running bike (non-motorized configuration) of FIG. 1.
Figure 10:
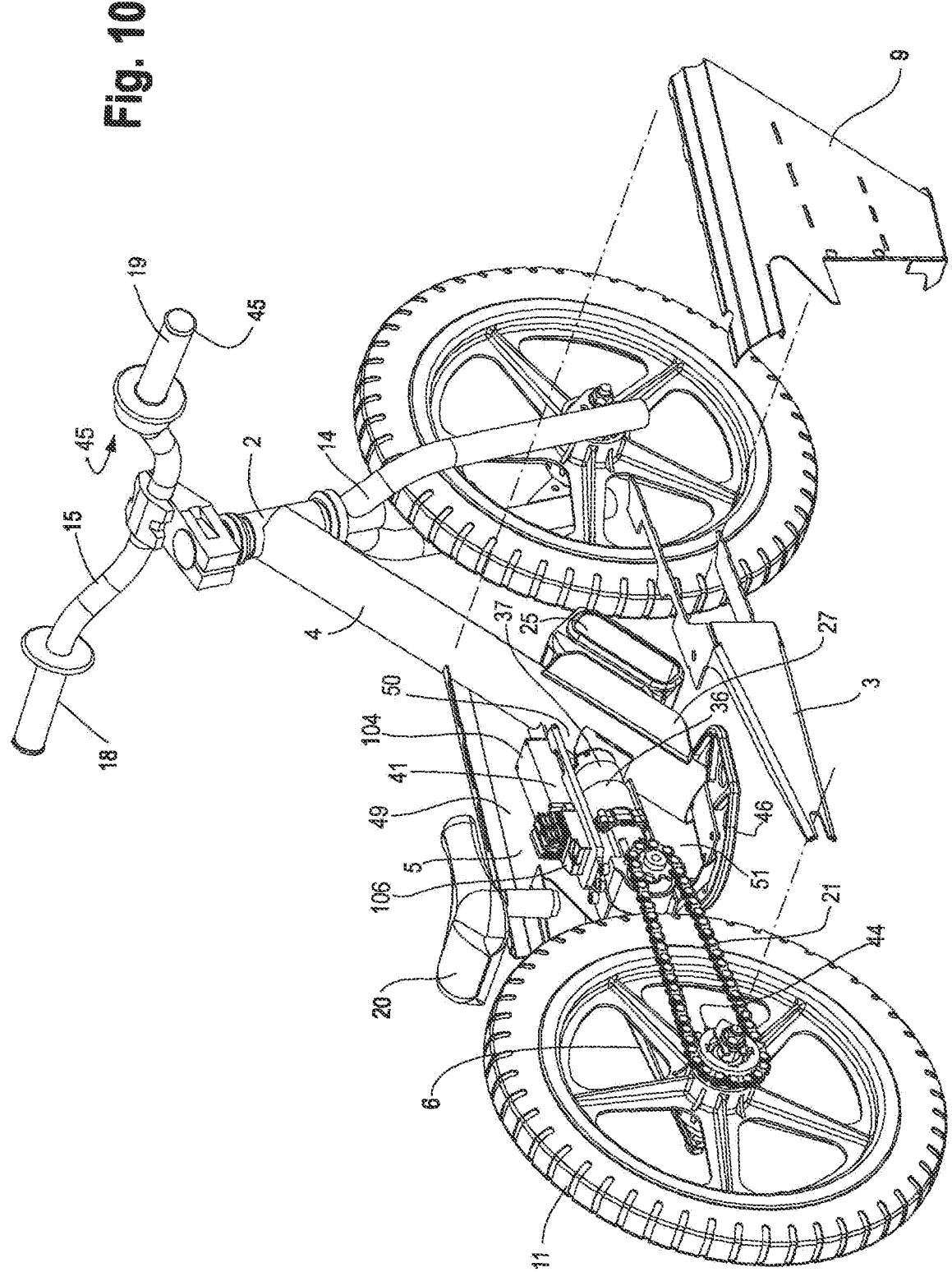
FIG. 10 is an exploded perspective view of the convertible running bike (motorized configuration) of FIG. 6.
Figure 12:
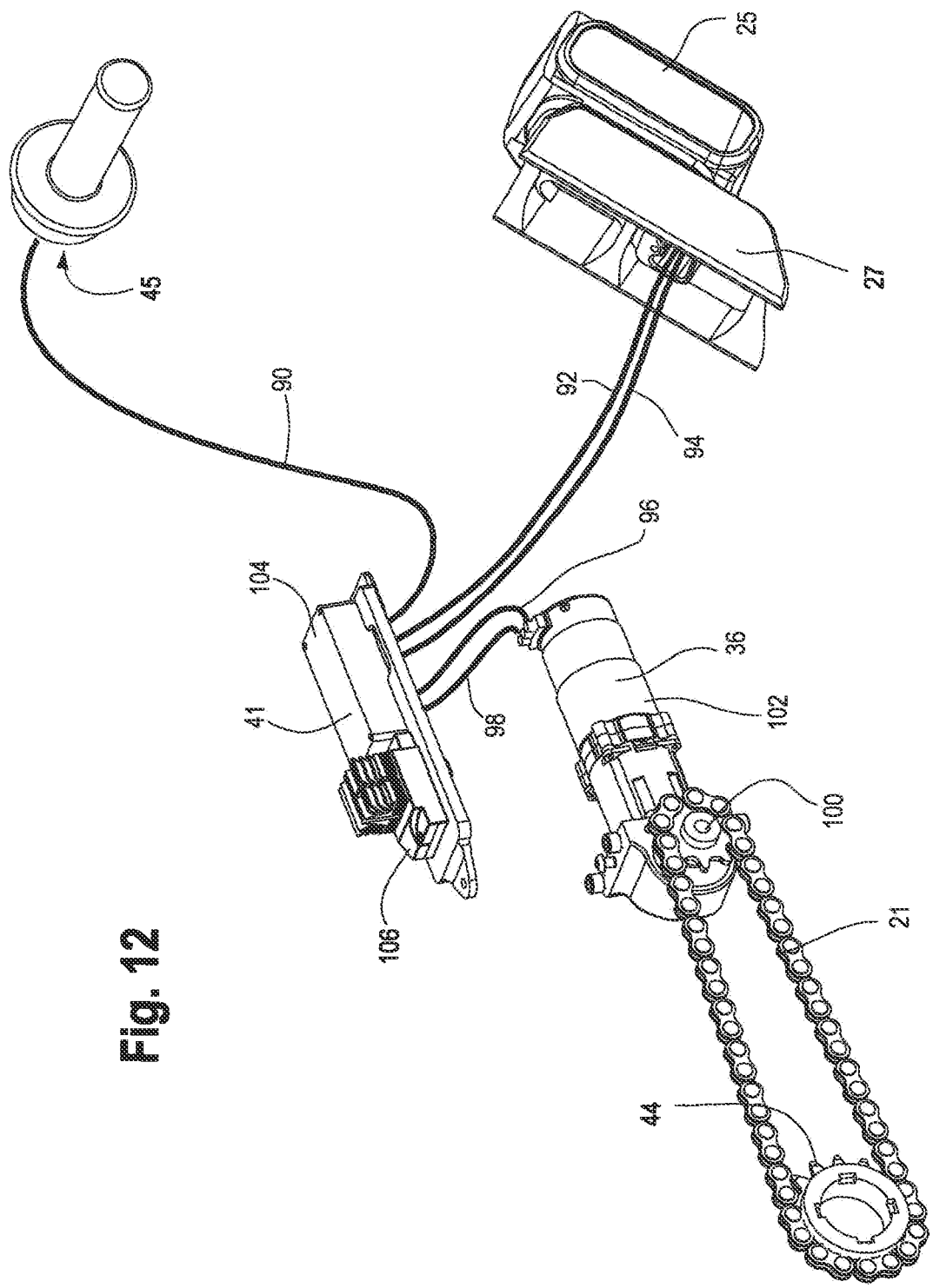
FIG. 12 shows a perspective pictorial view of various components that are installed on the convertible running bike (non-motorized configuration) of FIG. 1 to the convertible running bike (motorized configuration) of FIG. 6.

FIG. 5 shows the convertible running bike (non-motorized configuration) with an exploded view of the interior space of the mainframe assembly 84 provided by the rear fork left 6, the rear fork right 3, the mainframe left portion 5, the mainframe right portion 9 and the down tube 4. In an embodiment, an electronic control housing receiving region 49 defines an area designed to receive, selectively attach and protect electrical components for the convertible running bike (motorized configuration), such as the electronic control assembly 41 shown in FIG. 10. In an embodiment, a drivetrain receiving region 50 defines an area to receive, selectively attach and protect a drivetrain assembly 36, such as shown in FIGS. 10 and 12. The drivetrain assembly 36 consists of an electrical motor and transmission 102 that is controlled by the electrical control system 41 illustrated in FIG. 12. In an embodiment, the electrical motor 102 may be a brush motor or a brushless motor, or other motor of similar function. In an embodiment, an external battery mount 27 is connected to the down tube 4 and is designed to selectively receive a battery 25. Also shown is an internal battery receiving region 51 for receiving a battery inside the mainframe assembly 84 in another embodiment.

FIGS. 6-10 and FIG. 12 illustrate the components of the electrical drive system of the convertible running bike (motorized configuration). In a motorized configuration, the convertible running bike can perform in a similar manner and maintain all the functions of a running bike as when the convertible running bike is in non-motorized configuration, whether or not the propulsion is engaged. In various embodiments, some or all of the components described may be included by a user for use as a running bike, but not including other components, such as not including the battery 25, for example. In an embodiment, a shut-off switch may be provided to allow the running bike with some or all of the drivetrain components to operate as a running bike in a freewheel status.

A freewheel sprocket 44 is rotatably attached in a conventional technique to the rear wheel 11. In an embodiment, the freewheel sprocket 44 may comprise a BMX freewheel sprocket. For the convertible running bike 1 in the motorized configuration, a chain 21 is selectively connected between the sprocket 44 and a sprocket 100 disposed on the drivetrain assembly 36. The purpose of the chain 21 is to transfer force from the sprocket 100 to the sprocket 44, which in turn forces the rear wheel 11 to rotate and move the bike 1. Because of the gear reduction of the motor and transmission 102, combined with the freewheel sprocket 44, rearward motion is limited. In an embodiment, the sprocket 44 and the sprocket 100 may comprise conventional parts, such as bicycle sprockets. Further, the drivetrain assembly 36 is not limited to a chain drive system, but may also comprise a belt drive, shaft drive or other drive mechanism.

FIGS. 6-10 illustrate the convertible running bike 1 in a motorized configuration. FIG. 10 shows the internal placement of the electrical and mechanical drive system of the bike in the motorized configuration. In an embodiment, an electronic control assembly 41 is selectively and electronically coupled on top of and adjacent to the drivetrain assembly 36. In an embodiment, the battery 25 may be selectively engaged with the battery mount 27 on the exterior of the mainframe assembly 84 and electrically coupled to electronic control assembly 41. The electronic control assembly 41, the drivetrain assembly 36, the battery mount 27 and the external battery 25 may be connected to the mainframe assembly 84 and/or each other using conventional attachment devices, such as nut and bolt assemblies, so that these components may be easily installed or uninstalled by an adult by using conventional household tools.

Figure 11:
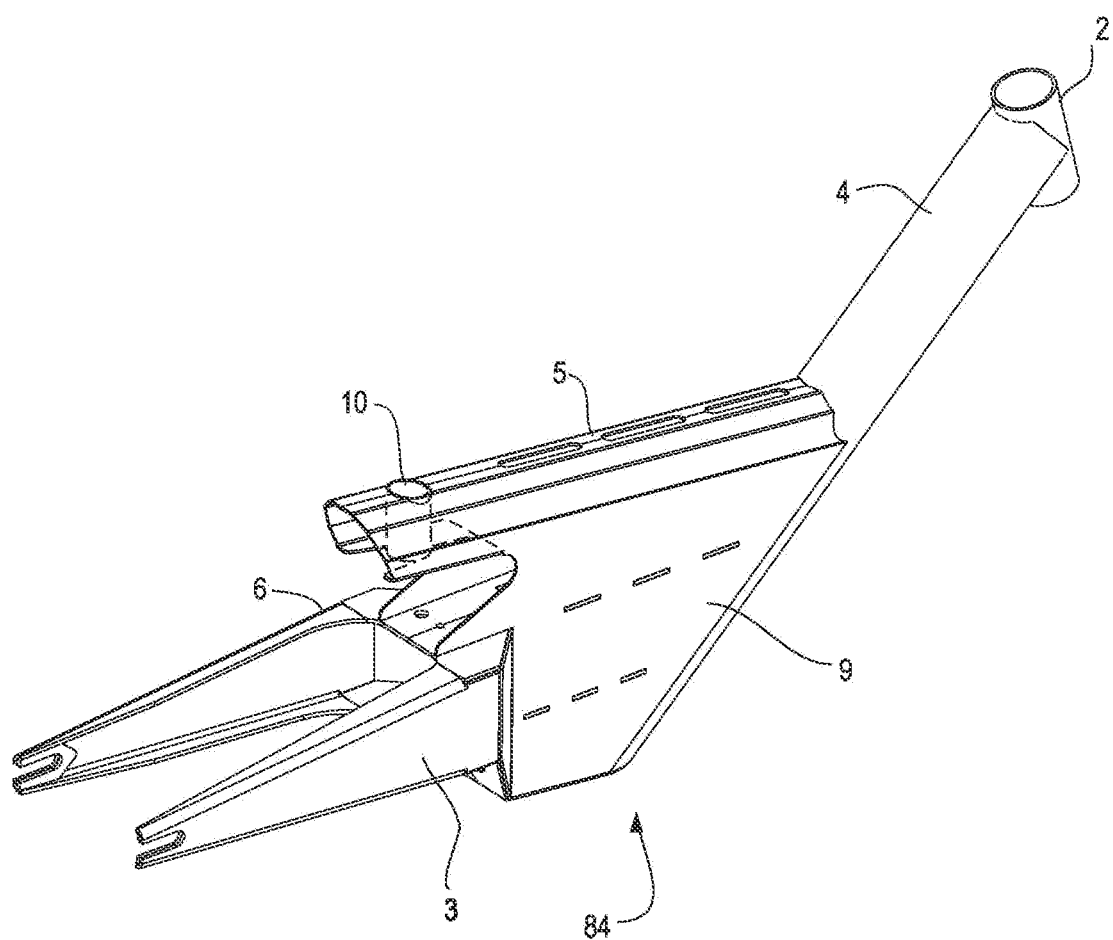
FIG. 11 shows a perspective view of an embodiment of a mainframe assembly of the convertible running bike of FIGS. 1 and 6.

FIG. 11 shows a close-up perspective view of an embodiment of a frame assembly 84 of the convertible running bike 1 as shown in FIGS. 1-10. The frame assembly 84 provides a compact protective shield for the various electrical and mechanical components that may be installed within the assembly 84.

FIG. 12 provides an exploded view of the various components that may be installed in order to convert the convertible running bike 1 from a non-motorized configuration to a motorized configuration. In an embodiment, electric cable 90 selectively couples the throttle sensor 45 with the electronic the electronic control assembly 41; electric cables 92 and 94 selectively couple the battery 25 through the external battery mount 27 to the electronic control assembly 41; and electric cables 96 and 98 selectively couple the drivetrain 36 to the electronic control assembly 41. In an embodiment, the throttle sensor 45 is coupled to the electronic control assembly 41, which in an embodiment comprises a central processing unit/receiver (CPU) 104 coupled to an electronic speed control (ESC) 106. Also shown is the chain 21 selectively connected between the sprocket 100 and the sprocket 44.

Figure 14:
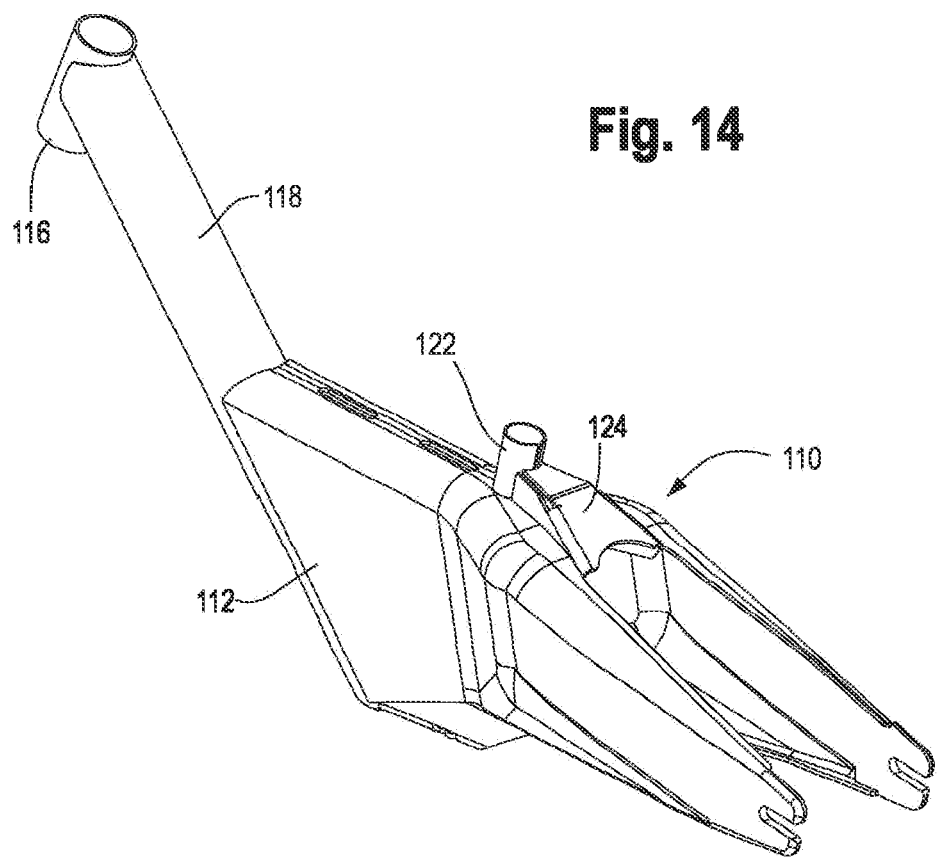
FIG. 14 shows a perspective view of another embodiment of a mainframe assembly of the convertible running bike.
Figure 15:
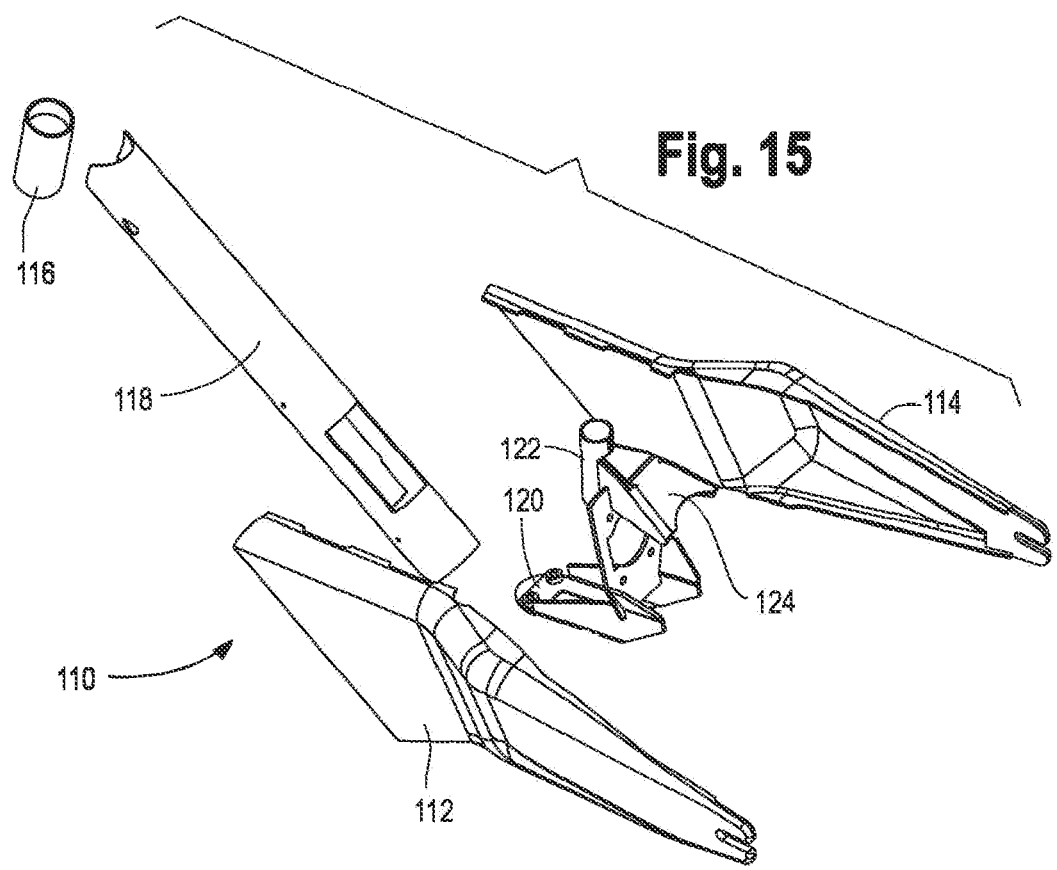
FIG. 15 shows an exploded perspective view of the various mainframe assembly components of FIG. 14.

FIG. 14 and FIG. 15 show an exploded view and a perspective view respectively of another embodiment of a mainframe assembly 110 of the convertible running bike. While this embodiment is similar to the mainframe assembly 84, the mainframe portions and rear forks have been combined into a mainframe/rear fork left portion 112 and a mainframe/rear fork right portion 114 in order to provide a more efficient mainframe and ease of manufacturing. The mainframe assembly 110 further comprises a steering tube 116 connected to a down tube 118, which is connected to the mainframe/rear fork left portion 112 and the mainframe/rear fork right portion 114. Steering tube 116 and down tube 118 are substantially similar to steering tube 2 and downtube 4 discussed above. In an embodiment, plate 120 and seat tube 122 are attached to drivetrain assembly mount 124. The plate 120 is used to attach a footrest similar to footrest 46, the seat tube 122 is used to attach a seat similar to seat 20 and the drivetrain assembly mount 124 is used to attach a drivetrain assembly similar to drivetrain assembly 36.

Figure 16:
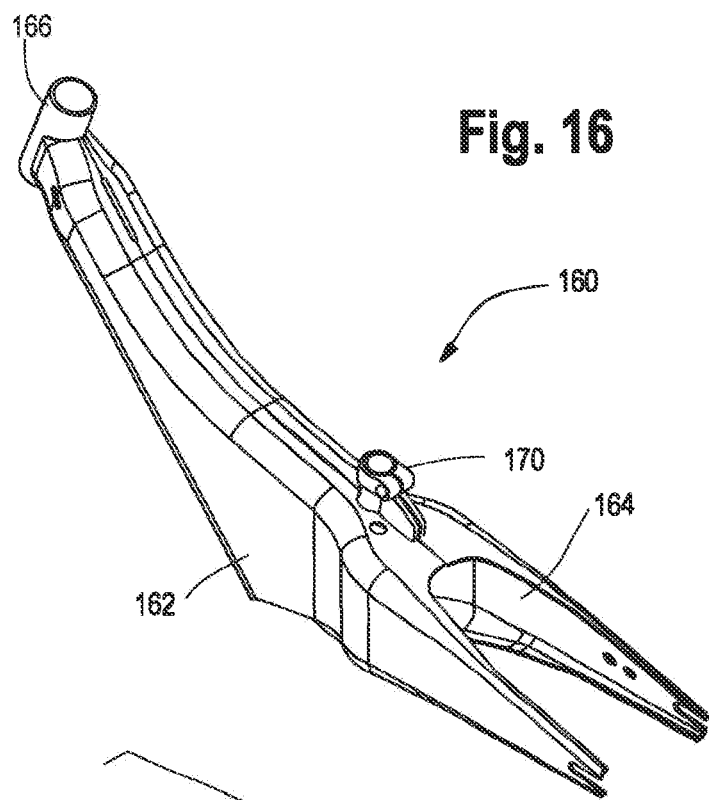
FIG. 16 shows a perspective view of another embodiment of a mainframe assembly of the convertible running bike.
Figure 17:
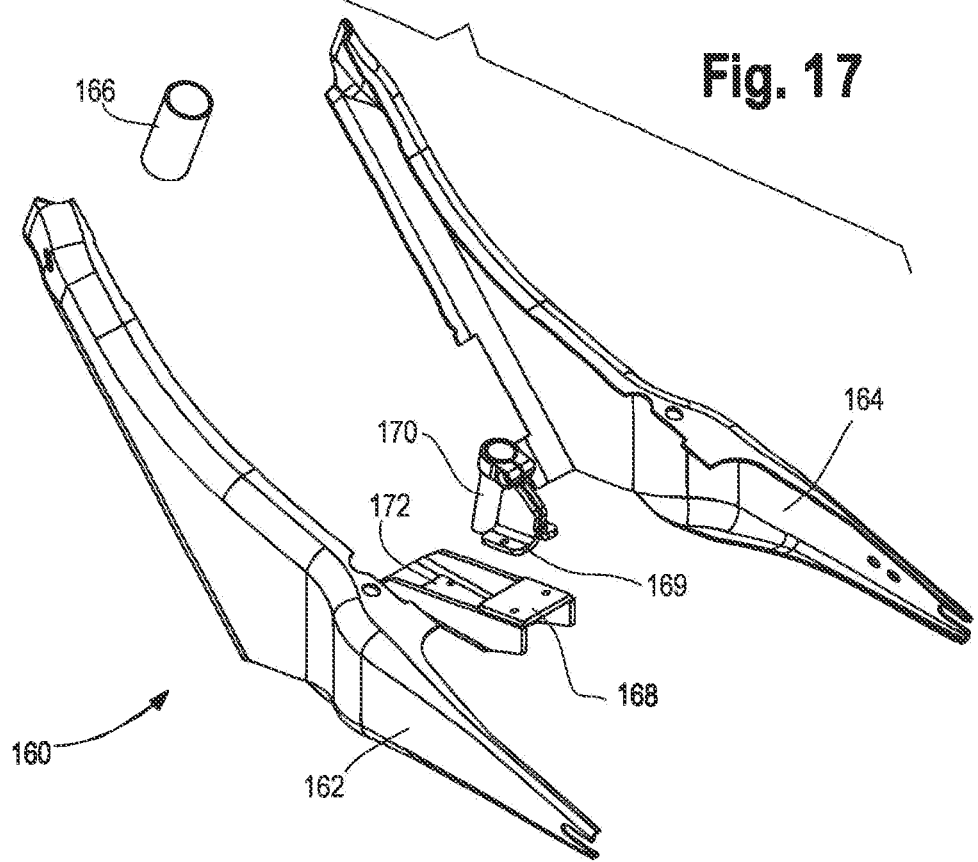
FIG. 17 shows an exploded perspective view of the various mainframe assembly components of FIG. 16.
Figure 18:
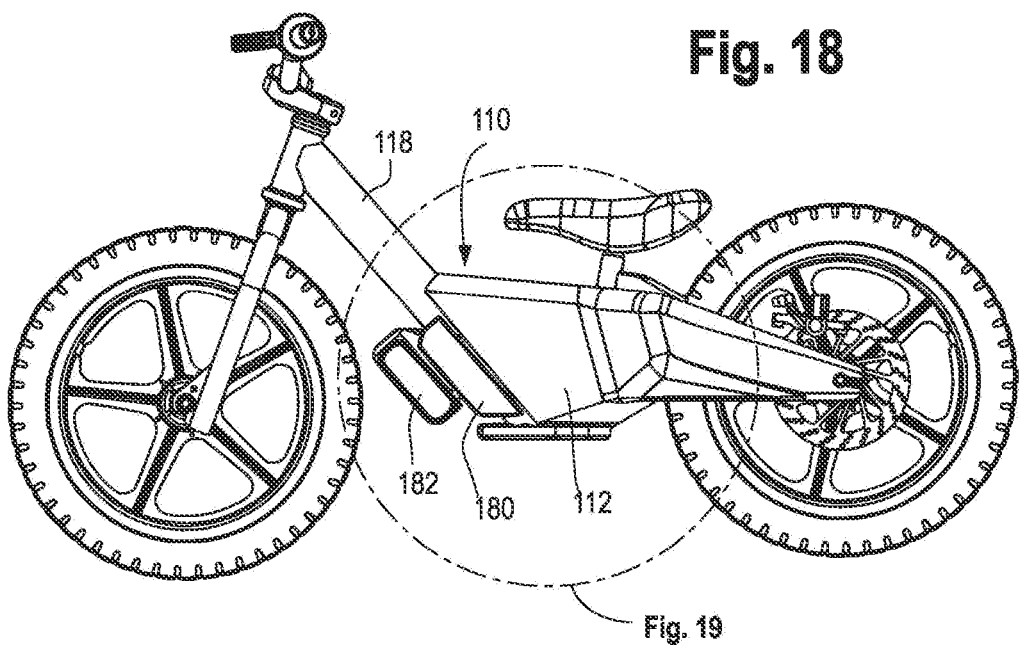
FIG. 18 is a side view of a convertible running bike (motorized configuration) including the mainframe assembly of FIGS. 14 and 15, and an electronic control/battery mount assembly according to an embodiment.
Figure 19:
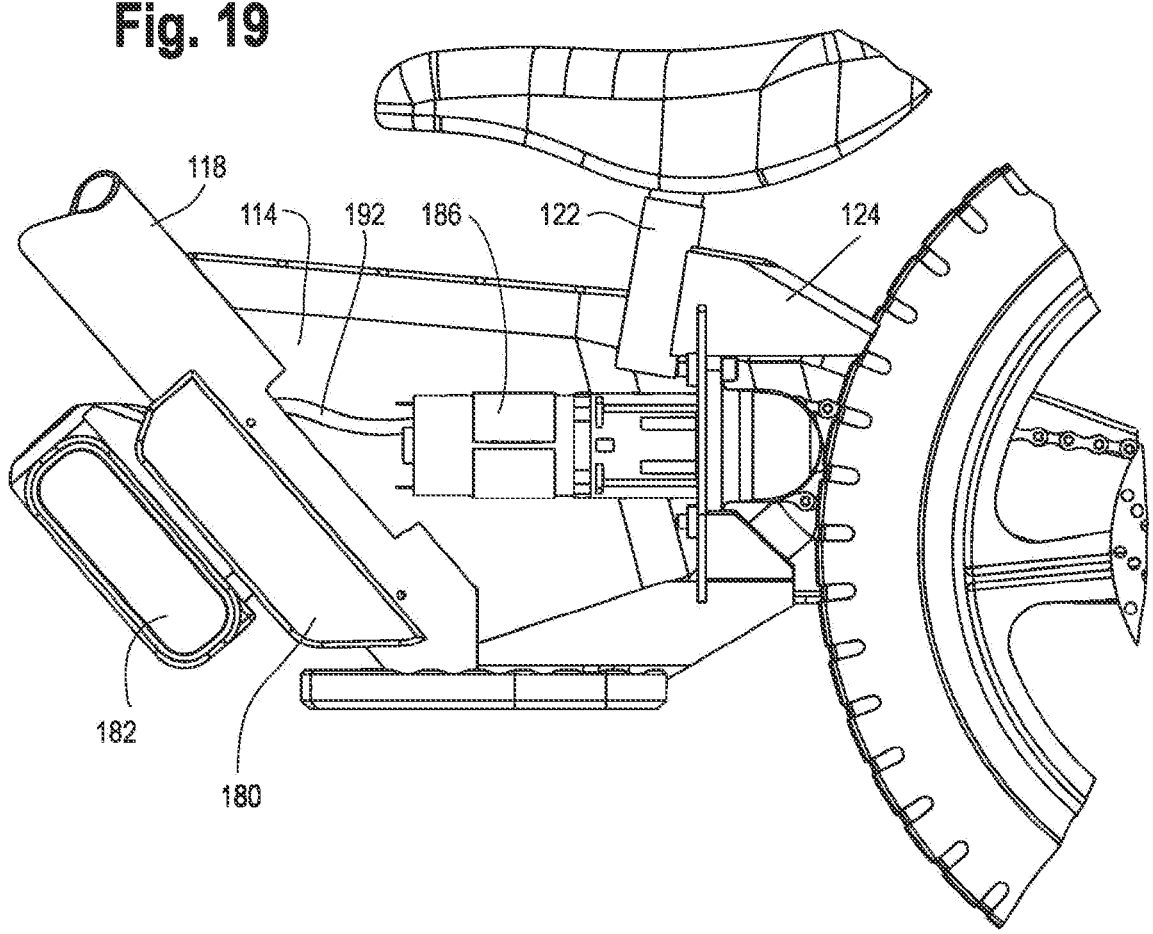
FIG. 19 is a close-up partial side view of a section of the convertible running bike (motorized configuration) of FIG. 18.

FIG. 16 and FIG. 17 show a perspective view and an exploded perspective view respectively of another embodiment of a mainframe assembly 160 of the convertible running bike. While this embodiment is similar to the mainframe assemblies 84 and 110, the mainframe portions, the rear forks and the down tube have been combined into a mainframe/rear fork/down tube left portion 162 and a mainframe/rear fork/down tube right portion 164 in order to provide a more efficient mainframe and ease of manufacturing. The mainframe assembly 160 further comprises a steering tube 166 connected to the mainframe/rear fork/down tube left portion 162 and the mainframe/rear fork/down tube right portion 164. Steering tube 166 is substantially similar to steering tube 2 discussed above. In an embodiment, plate 172 and seat tube 170 are attached to drivetrain assembly mount components 168 and 169 respectively. The plate 172 is used to attach a footrest similar to footrest 46, the seat tube 170 is used to attach a seat similar to seat 20 and the drivetrain assembly mount components 168 and 169 are used to attach a drivetrain assembly similar to drivetrain assembly 36.

Figure 13:
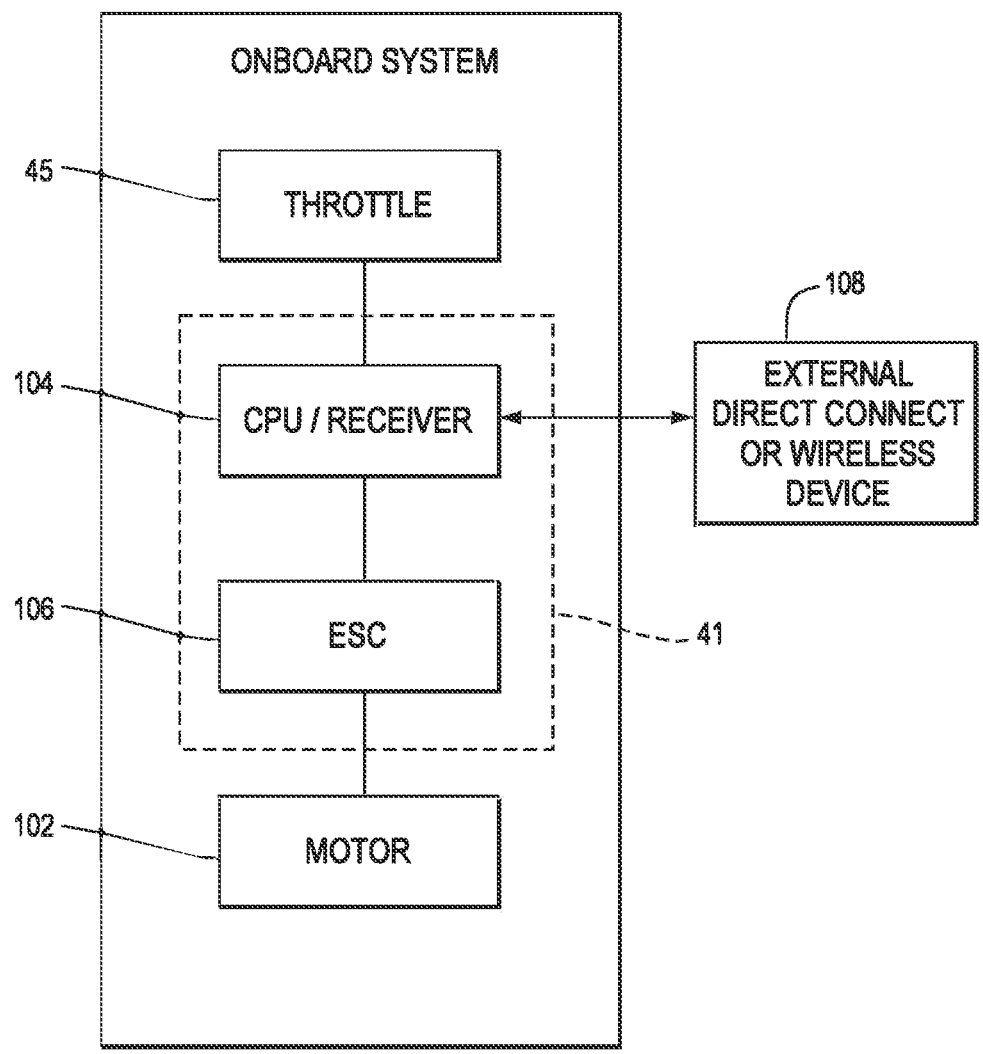
FIG. 13 shows a block diagram of electrical components for the convertible running bike (motorized configuration) of FIG. 6.

As illustrated in the schematic diagram in FIG. 13, the throttle sensor 45 is coupled to the electronic control assembly 41, which in an embodiment comprises the central processing unit/receiver (CPU) 104 coupled to the electronic speed control (ESC) 106. In an embodiment, the CPU 104 receives a signal from the throttle sensor 45 based on an input from a rider. The signal is then transmitted to the ESC 106 which controls the delivery of power from the battery 25 provided to the motor 102. In an embodiment, the ESC 106 includes a microcontroller device.

FIGS. 18-22 illustrate a convertible running bike (motorized configuration) including the mainframe assembly 110 of FIGS. 14 and 15, and a combined electronic control/battery mount assembly 180 according to an embodiment. The electronic control/battery mount assembly 180 comprises substantially similar components as the electronic control assembly 41 and the external battery mount 27 as discussed above. In an embodiment, a drivetrain assembly 186 is selectively connected to the drivetrain assembly mount 124 and to the electronic control/battery mount assembly 180 via cable 192. Battery 182 is selectively coupled to the electronic control/battery mount assembly 180.

In the close-up and exploded views of FIGS. 18-22, the electronic control/battery mount assembly 180 comprises a combined central processing unit/receiver/electronic speed control (CPU/ESC) 183 that performs in a substantially similar fashion to the central processing unit/receiver (CPU) 104 and the electronic speed control (ESC) 106 discussed above. The CPU/ESC 183 is electronically coupled to the battery 182 via cables 188 and 190. The electronic control/battery mount assembly 180 is attached to the down tube 118 with fastener(s) such as fastening components 186.

In an embodiment of the convertible running bike 1 in the motorized configuration, FIG. 13 also includes an optional external direct connect or wireless device 108 that may be used to connect, wired or wirelessly, to an external smart device or computer to allow programming and/or real-time external control of the propulsion system. In this embodiment, the external direct connect or wireless device 108 allows an adult to set the convertible running bike 1 to be safely powered at a speed that is less than the ability of the child. In an embodiment, this speed control function may also be accomplished through direct control on the convertible running bike 1 through methods such as providing a screw setting or knob (not shown) on the bike 1. The CPU 104 may connect to an external wireless transmitter/receiver that can communicate with the CPU 104 via Bluetooth, RF or other wireless protocols. In addition, the convertible running bike 1 may include a function that allows a supervising adult to provide a power limit or cut-off for the bike 1 if it travels out of a specified range, or if the adult feels the child needs to be stopped or slowed down.

In an embodiment, the CPU 104 may include a GPS navigation device (shown in FIG. 26 as 223). The GPS device allows the remote tracking of the bike 1 by a supervising adult via a wireless connection such as Bluetooth, RF, Wi-Fi or other wireless protocols. The GPS device may be used to track location of the bike 1 (or bike 201 in FIG. 26) in various environments such as on a track. When a rider is going around the track, the GPS may send location and speed data though the wireless connection. This data may be used to provide monitoring of race speeds by registering race track lap times or calculating position of racers on the track.

In an embodiment, an application (app) for a smart device such as a phone or tablet may be downloaded by a supervising adult to receive data transmitted from the bike 1 such as location and speed data based on GPS device readings. In another embodiment, the CPU 104 may transmit reliability data concerning the usage and status of the drivetrain assembly 186 or other components for monitoring of service requirements for the bike 1. The reliability status data may be transmitted at preset programmed intervals or on command from instructions from a supervising adult or service personnel.

Embodiments are shown below of the methods of converting the convertible running bike 1 from a non-motorized configuration into a motorized configuration. All of the steps below may be accomplished using conventional tools located in homes.

Conversion Method for Internal Electronic Control Assembly/External Battery Mount 1. Remove rear wheel 11 via standard bicycle procedures.
2. Remove fastener(s) [three bolts in an embodiment] holding the external battery mount 27.
3. Install freewheel sprocket 44 onto rear wheel 11 per conventional bicycle procedures.
4. Position the drivetrain assembly 36 into the drivetrain receiving region 50 in the mainframe assembly 84. Install the fastener(s) [four bolts in an embodiment] to affix the drivetrain assembly 36 to the drivetrain receiving region 50 in the mainframe assembly 84.
5. Connect the electric cables 96 and 98 from the drivetrain assembly 36 to the electronic control assembly 41 through the mainframe assembly 84 while the speed electronic control assembly 41 is positioned aft of its final position in the drivetrain receiving region 50.
6. Remove the right side grip 19 from the handlebar 15 and install the throttle sensor 45 securely to the handlebar 15.
7. Connect the electric cable 90 from the throttle sensor 45 through the downtube 4 via normal bicycle cable routing techniques and connect the electric cable 90 to the electronic control assembly 41.
8. Connect the electric cables 92 and 94 from the battery mount 27 through the downtube 4 to the electronic control assembly 41.
9. Reposition the battery mount 27 back onto the downtube 4 and reinstall the fastener(s).

10. Position the electronic control assembly 41 into position in the electronic control housing receiving region 49 in the mainframe assembly 84 and secure with fastener(s).
11. Position the rear wheel 11 with attached freewheel sprocket 44 onto the rear fork right 3 and the rear fork left 6 and install the chain 21 per conventional bicycle procedures.
12. Position the battery 25 onto the battery mount 27 and the convertible running bike is now operational in a motorized configuration.

Conversion Method for External Electronic Control/Battery Mount Assembly

1. Remove rear wheel 11 via standard bicycle procedures.
2. Remove fastener(s) [three bolts in an embodiment] holding the external battery mount 180.
3. Install freewheel sprocket 44 onto rear wheel 11 per conventional bicycle procedures.
4. Position the drivetrain assembly 186 into the drivetrain receiving region in the mainframe assembly 110. Install the fastener(s) [four bolts in an embodiment] to affix the drivetrain assembly 186 to the drivetrain receiving region in the mainframe assembly 110.
5. Connect the electric cable 192 from the drivetrain assembly 186 to the electronic control/battery mount assembly 180 through the mainframe assembly 110 while the electronic control/battery mount assembly 180 is positioned forward of the downtube 118.
6. Remove the right side grip 19 from the handlebar 15 and install the throttle sensor 45 securely to the handlebar 15.
7. Connect the electric cable 90 from the throttle sensor 45 through the downtube 4 via normal bicycle cable routing techniques and connect the electric cable 90 to the electronic control/battery mount assembly 180.
8. Reposition the electronic control/battery mount assembly 180 back onto the downtube 118 and reinstall the fastener(s).
9. Position the rear wheel 11 with attached freewheel sprocket 44 onto the mainframe/rear fork right portion and the mainframe/rear fork left portion and install the chain 21 per conventional bicycle procedures.
10. Position the battery 182 onto the electronic control/battery mount assembly 180 and the convertible running bike is now operational in a motorized configuration.

Typically, electric cycles utilize a simpler direct motor connection without a large gear reduction. However, in embodiments of the present invention, the motor and transmission 102 employs a small, high rpm motor with a large planetary gear reduction and a 90 degree angle drive output, which allows for a lighter, more compact drivetrain. Additionally, combined with freewheel sprocket 44, this allows for conservation of energy, because the motor and transmission does not have to turn while coasting. This embodiment also limits rearward motion or rollback when a child stops on an upward incline. The small diameter and orientation of the motor and transmission 102 allows its placement in the frame assembly to provide a centralized center of gravity, as well as a narrow profile that provides additional clearance for children's legs for use as a running cycle.

In an embodiment, the CPU 104 may be programmed to sense the amp draw and determine whether the rider has "pushed" the bike to start the forward movement. This program feature provides an additional feature to require a rider to push the bike to start rolling, which would reduce the initial amp draw on the motor, and so the CPU 104 can sense that the rider started pushing the bike from zero. This feature may reduce concerns about a child grabbing and twisting the throttle, and possibly advancing forward with only one hand on the handlebars in an unsafe manner.

The CPU 104 may also have a sensor to determine orientation and acceleration of the running cycle. This can be utilized to limit or modify motor activity, as well as provide safety shutoffs if conditions warrant.

In an embodiment, the battery mount system 180 may interface with the battery 182 in a mechanical or electrical manner in order to select preset motor performance.

FIGS. 23-25 illustrate another convertible running bike in a motorized configuration 201 including a sound system 210 according to an embodiment. The sound system 210 may comprise a speaker, or a sound exciter or inducer. The speaker may include a battery. The sound system 210 may provide sounds to a rider that could relate to entertainment or safety concerns. For example, the sound system may broadcast sounds that mimic a particular brand of motorcycle or other types of vehicle. The sounds may be variable in pitch or volume based on the speed of a bike 201. In an embodiment, sounds may be downloaded by a rider or an adult supervisor through the app and transmitted to the bike 201.

FIGS. 23(*a*) and 23(*b*) show an example of a sound system 210 as mounted on a number plate 212. The number plate 212 may be mounted on a handlebar 207 having a left grip 203 and a right grip 205. The number plate 212 may display a number for the bike 201 that is used to identify the rider in a race environment for example. The sound system 210 may be mounted on a portion of the number plate 212 that is facing the rider for better sound transmission to the rider. In other embodiments, the speaker may be attached in substantially any location on the bike 201, while the sound exciter or inducer may be located on any surface on the bike 201 that is substantially semi-flat.

FIG. 25 shows other locations for mounting the sound system 210 including inside a battery 215 which is substantially similar to battery 25. In this embodiment, the sound system may be powered by the battery 215. The sound system 210 may also be mounted inside a side panel 218. Additional locations are possible for mounting the sound system 210 on the bike 201 such that the sound is transmitted to a rider.

FIG. 26(*a*) and FIG. 26(*b*) illustrate another convertible running bike in a motorized configuration 201 including a clutch 220 according to an embodiment. The clutch 220 may be attached a handlebar 204 and adjacent to a left grip 203. In another embodiment, the clutch 220 could be mounted on the handlebar 204 and adjacent to a right grip 205. In operation in one embodiment, when a rider grasps and pulls the clutch 220 towards the left grip 203, power may be proportionally reduced electronically to the drivetrain to mimic a response of using a clutch on a motorcycle. Similarly, as the rider releases the clutch 220, power may be proportionally increased electronically to the drivetrain.

While the rider is pulling the clutch 220, a sound may be transmitted through a sound system 210 that mimics a motor revving at proportionally increasing volume such as on a motorcycle. While the rider is releasing the clutch 220, a sound may be transmitted through the sound system 210 that mimics a motor revving at proportionally decreasing volume such as on a motorcycle. When the rider is not engaging the clutch 220, a sound may be transmitted through the sound system 210 that mimics a motorcycle motor that is idling. In another example, the transmitted sounds may mimic sounds from a motorcycle that is involved in an actual racing start.

In this embodiment, the rider may first engage the clutch 220 at approximately 50% level for example which causes the sound system 210 to correspondingly produces a simulated revving engine sound. Then, the rider may quickly release the clutch 220 and the sound system 210 correspondingly produces a high acceleration racing start sound. In other embodiments, this arrangement and operation of the clutch 220 and the sound system 210 may be employed on standard motorcycles.

FIG. 26 also shows a GPS device 223 as described above which allows the remote tracking of the bike 1 by a supervising adult via a wireless connection such as Bluetooth, RF, Wi-Fi or other wireless protocols.

FIGS. 27-29 illustrate another convertible running bike in a motorized configuration 201 including a footrest 226 according to an embodiment. The footrest 226 may include a front left angled portion 230 and a front right angled portion 228 and may be connected to a mainframe assembly 227 of the bike 201 with fasteners 229 and 231. Similar to the footrest 46, the front angled portions 230 and 228 of the footrest 226 provide a gentle slope such that is a child rider is straddling the bike 201 and is standing directly in front of the footrest 226, if the bike 201 moves in the direction of the child's feet, the front angled portions 230 and 228 cause the child's feet and/or legs to be pushed outwardly away from the bike.

Similarly, the footrest 226 may include a rear left angled portion 235 and a rear right angled portion 232. The rear angled portions 235 and 232 of the footrest 226 provide a gentle slope such that is a child rider is straddling the bike 201 and is standing directly in back of the footrest 226, if the bike 201 moves in the direction of the child's feet, the rear angled portions 235 and 232 cause the child's feet and/or legs to be pushed outwardly away from the bike.

In an embodiment, the handlebar 204, the left grip 203 and the right grip 205 may be scaled in various sizes to accommodate a rider's hands which are generally smaller in size and also vary. For example, the diameter of the handlebar 204 may include a diameter of approximately ⅞, 1, 1.25, 1.5 and 1.75 inches. Grips 203 and 205 of corresponding sizes are used along with the handlebar 204.

In various embodiments, the present invention can apply to other motorized transportation devices such as wheelchairs or strollers.

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed:

1. A bike comprising:
a front fork rotatably engaged with a front wheel;
a rear fork rotatably engaged with a rear wheel;
a handlebar coupled to the front fork for steering the bike;
a frame extending between and connecting the front fork and the rear fork;
an electronic controller coupled to the frame;
a drivetrain assembly coupled to the frame and in communication with the electronic controller, the drivetrain assembly including an electric motor configured to selectively drive the rear wheel;
a battery configured to selectively provide power to the drivetrain assembly; and
a clutch lever coupled to the handlebar and in communication with the electronic controller, the clutch lever configured to be actuated by an operator to proportionally increase or decrease power to the drivetrain assembly electronically to mimic a response of using a clutch between the electric motor and the rear wheel.

2. The bike of claim 1, wherein the handlebar includes a left grip and a right grip, and wherein the clutch lever is coupled to the handlebar adjacent to the left grip.

3. The bike of claim 1, further comprising a battery mount for selectively receiving the battery.

4. The bike of claim 1, further comprising
a throttle input operable by a rider of the bike;
a throttle sensor coupled to the electronic controller and operable to detect a position of the throttle input;
a first sprocket being driven by the electric motor;
a second sprocket connected to the rear wheel;
a chain connected to the first sprocket and the second sprocket;
wherein the electronic controller causes the drivetrain assembly to rotate the first sprocket in response to the position of the throttle input detected by the throttle sensor, and
wherein the first sprocket drives the chain which rotates the second sprocket and the rear wheel.

5. The bike of claim 1, further comprising a footrest support connected to a lower portion of the frame and a footrest connected to and supported by the frame adjacent the lower portion of the frame by the footrest support.

6. The bike of claim 1, further comprising a sound system, and wherein a sound is transmitted through the sound system to produce variable motor revving sounds in response to movement of the clutch lever.

7. The bike of claim 6, wherein the variable motor revving sounds are proportionally increased or decreased in volume in response to movement of the clutch lever.

8. The bike of claim 6, wherein the variable motor revving sounds mimics sounds from a motorcycle that is involved in a racing start.

9. A bike comprising:
a front fork rotatably engaged with a front wheel;
a rear fork rotatably engaged with a rear wheel;
a handlebar coupled to the front fork for steering the bike;
a frame extending between and connecting the front fork and the rear fork;
an electronic controller coupled to the frame;
a throttle input operable by a rider of the bike;
a throttle sensor coupled to the electronic controller and operable to detect a position of the throttle input;
a drivetrain assembly coupled to the frame, the drivetrain assembly having an electric motor configured to selectively drive the rear wheel in response to the position of the throttle input detected by the throttle sensor;
a battery configured to selectively provide power to the drivetrain assembly;
a clutch lever coupled to the handlebar, the clutch lever configured to be actuated by an operator to proportionally increase or decrease power to the drivetrain assembly, without disconnecting the drivetrain assembly from the rear wheel; and a sound system, wherein a sound is transmitted through the sound system to produce variable motor revving sounds in response to movement of the clutch lever.

10. The bike of claim 9, wherein the handlebar includes a left grip and a right grip, and wherein the clutch lever is coupled to the handlebar adjacent to the left grip.

11. The bike of claim 9, further comprising a battery mount for selectively receiving the battery.

12. The bike of claim 9, wherein
the drivetrain assembly includes a first sprocket driven by the electric motor, a second sprocket connected to the rear wheel, and a chain connected to the first sprocket and the second sprocket,
the electronic controller causes the drivetrain assembly to rotate the first sprocket in response to the position of the throttle input detected by the throttle sensor, and
the first sprocket drives the chain which rotates the second sprocket and the rear wheel.

13. The bike of claim 9, further comprising a footrest support connected to a lower portion of the frame and a footrest connected to and supported by the frame adjacent the lower portion of the frame by the footrest support.

14. The bike of claim 9, wherein the variable motor revving sounds are proportionally increased or decreased in volume in response to movement of the clutch lever.

15. The bike of claim 9, wherein the variable motor revving sounds mimics sounds from a motorcycle that is involved in a racing start.

16. The bike of claim 9, wherein the clutch lever is in communication with the electronic controller, and wherein the electronic controller proportionally increases or decreases power electronically in response to the clutch lever being actuated by the operator.

17. A bike comprising:
a front fork rotatably engaged with a front wheel;
a rear fork rotatably engaged with a rear wheel;
a handlebar coupled to the front fork for steering the bike;
a frame extending between and connecting the front fork and the rear fork;
an electronic controller coupled to the frame;
a drivetrain assembly coupled to the frame and in communication with the electronic controller, the drivetrain assembly including an electric motor configured to selectively drive the rear wheel;
a battery configured to selectively provide power to the drivetrain assembly;
a clutch lever coupled to the handlebar, the clutch lever configured to be actuated by an operator to proportionally increase or decrease power to the drivetrain assembly; and
a sound system configured to transmit a sound to produce variable motor revving sounds in response to movement of the clutch lever.

18. The bike of claim 17, wherein the handlebar includes a left grip and a right grip, and wherein the clutch lever is coupled to the handlebar adjacent to the left grip.

19. The bike of claim 17, further comprising a battery mount for selectively receiving the battery.

20. The bike of claim 17, wherein the drivetrain assembly further comprises
a first sprocket being driven by the electric motor,
a throttle input operable by a rider of the bike,
a throttle sensor coupled to the electronic controller and operable to detect a position of the throttle input,
a second sprocket connected to the rear wheel, and
a chain connected to the first sprocket and the second sprocket,
wherein the electronic controller causes the drivetrain assembly to rotate the first sprocket in response to the position of the throttle input detected by the throttle sensor, and
wherein the first sprocket drives the chain which rotates the second sprocket and the rear wheel.

21. The bike of claim 17, further comprising a footrest support connected to a lower portion of the frame and a footrest connected to and supported by the frame adjacent the lower portion of the frame by the footrest support.

22. The bike of claim 17, wherein the variable motor revving sounds are adjusted in response to the proportional increase or decrease power to the drivetrain assembly.

23. The bike of claim 17, wherein the variable motor revving sounds are proportionally increased or decreased in volume in response to movement of the clutch lever.

24. The bike of claim 17, wherein the variable motor revving sounds mimics sounds from a motorcycle that is involved in a racing start.

* * * * *